United States Patent
Kunkel et al.

(10) Patent No.: US 8,831,343 B2
(45) Date of Patent: Sep. 9, 2014

(54) IMAGE PROCESSING AND DISPLAYING METHODS FOR DEVICES THAT IMPLEMENT COLOR APPEARANCE MODELS

(75) Inventors: Timo Kunkel, Vancouver (CA); Erik Reinhard, Long Ashton (GB); Gerwin Damberg, Vancouver (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 564 days.

(21) Appl. No.: 13/144,983

(22) PCT Filed: Jan. 18, 2010

(86) PCT No.: PCT/US2010/021329
§ 371 (c)(1),
(2), (4) Date: Jul. 18, 2011

(87) PCT Pub. No.: WO2010/083493
PCT Pub. Date: Jul. 22, 2010

(65) Prior Publication Data
US 2011/0305391 A1  Dec. 15, 2011

Related U.S. Application Data

(60) Provisional application No. 61/145,739, filed on Jan. 19, 2009.

(51) Int. Cl.
*G06K 9/00* (2006.01)
*H04N 1/60* (2006.01)

(52) U.S. Cl.
CPC .................................. *H04N 1/6088* (2013.01)
USPC .......................................................... 382/167

(58) Field of Classification Search
USPC ............ 382/162, 167; 358/1.9, 2.1, 518–520; 345/589–592
See application file for complete search history.

(56) References Cited

U.S. PATENT DOCUMENTS 6,741,753 B1    5/2004  Moroney
6,995,865 B1 *  2/2006  Motomura ..................... 358/1.9
(Continued)

FOREIGN PATENT DOCUMENTS

EP    0993180      4/2000
EP    1770999      4/2007
WO    2006088683   8/2006

OTHER PUBLICATIONS

Alessi, et al., "A Colour Appearance Model for Colour Management Systems: CIECAM02" Technical Report published by Commission Internationale De L'Eclairage, Vienna, Austrai, Jan. 1, 2004, pp. 1-15.

(Continued)

*Primary Examiner* — Ishrat I Sherali
(74) *Attorney, Agent, or Firm* — John W. Carpenter

(57) ABSTRACT

Embodiments of the invention relate generally to image and display processing, and more particularly, to systems, apparatuses, integrated circuits, computer-readable media, and methods that facilitate the prediction of the appearance of color in images for different viewing environments, including high dynamic range images. In some embodiments a method can modify color associated with a source environment at a target environment. The method can include applying different non-linear functions to transform subsets of data representing a color of a sample at the source environment into transformed subsets of data, and generating data representing a chroma correlate as an appearance correlate independent of data representing a hue-related correlate. The chroma correlate can be configured to generate the color at a device at the target environment.

19 Claims, 10 Drawing Sheets

(56) References Cited

U.S. PATENT DOCUMENTS

| | | | |
|---|---|---|---|
| 7,697,167 B2 * | 4/2010 | Hatori | 358/2.1 |
| 7,755,637 B2 * | 7/2010 | Newman | 345/589 |
| 8,483,479 B2 * | 7/2013 | Kunkel et al. | 382/165 |
| 8,520,023 B2 * | 8/2013 | Sullivan et al. | 345/590 |
| 8,520,936 B2 * | 8/2013 | Romney | 382/162 |
| 2005/0275911 A1 | 12/2005 | Yamada | |
| 2007/0058181 A1 | 3/2007 | Hatori | |
| 2007/0206853 A1 * | 9/2007 | Kim et al. | 382/167 |
| 2011/0050695 A1 * | 3/2011 | Sullivan et al. | 345/426 |

OTHER PUBLICATIONS

Capilla, et al., "On Saturation and Related Parameters Following Guth's ATD Colour-Vision Model" Color Resesarch and Application, vol. 26, No. 4, Aug. 2001, pp. 305-321.

Moroney, et al., "The CIECAM02 Color Appearance Model" Color Science and Engineering: Systems, Technologies, Applications: Final Program and Proceedings of IS&T and SID Tenth Color Imaging Conference, IS&T, pp. 23-27, Jan. 1, 2002.

\* cited by examiner

IMAGE PROCESSING AND DISPLAYING METHODS FOR DEVICES THAT IMPLEMENT COLOR APPEARANCE MODELS

CROSS-REFERENCE TO RELATED APPLICATIONS

This application claims priority to U.S. Provisional Patent Application No. 61/145,739 filed Jan. 19, 2009, hereby incorporated by reference in its entirety. Embodiments of the invention relate generally to image and display processing, and more particularly, to systems, apparatuses, integrated circuits, computer-readable media, and methods that facilitate the prediction of the appearance of color for images in different viewing environments.

BACKGROUND

Color appearance models ("CAMs") have been developed to match colors under different environment conditions that otherwise might be perceived to be different, according to the human visual system ("HVS"). In particular, a color captured (e.g., in an image) under one set of conditions may be perceived as a different color by an observer viewing that color in another set of conditions. The following are examples of factors that can contribute to perceptible color mismatches: the different chromacities and/or luminance levels of different illuminants, different types of devices used to display the color, the relative luminance of the background, different conditions of the surrounding environment, as well as other factors. Conventional color appearance models try to compensate for these factors by adjusting an image viewed with a destination set of conditions so that it appears to be the same color at which it was captured with a source set of conditions. Thus, color appearance models can be used to convert a patch of color seen in one environment (e.g., the source environment) to an equivalent patch of color as it would be observed in a different environment (e.g., the target environment).

In some approaches, a traditional color appearance model usually consists of the following three stages: chromatic adaptation, non-linear response compression, and appearance predictor generation, the appearance predictors usually describe the human visual response to a colored test patch with respect to a specific light source. While functional, some of these approaches to match colors under different conditions have drawbacks. In at least one approach, chromatic adaptation and non-linear response compression usually are performed sequentially in separate color spaces. In particular, chromatic adaptation typically is performed in a sharpened color space, whereas the non-linear response compression generally is performed in a cone space. Transforming between the sharpened color space and the cone space generally requires computational resources. Further, photoreceptors do not appear, at least in some cases, to physiologically implement spectrally sharpened cone responses. In some approaches, performing chromatic adaptation in a sharpened color space might affect generation of appearance predictors, such as a hue predictor. In at least one approach, the use of separate color spaces for implementing chromatic adaptation and non-linear response compression typically applies similar computations to the different color channels, which might introduce channel interdependencies that generally are not present among the long, medium, and short cones in photoreceptors. In some conventional color appearance models, some appearance predictors are used to determine others.

In view of the foregoing, it would be desirable to provide systems, computer-readable media, methods, integrated circuits, and apparatuses to facilitate the prediction of the appearance of color in images for different viewing environments, including high dynamic range images.

SUMMARY

Embodiments of the invention relate generally to image and display processing, and more particularly, to systems, apparatuses, integrated circuits, computer-readable media, and methods that facilitate the prediction of the appearance of color in images for different viewing environments, including high dynamic range images. In some embodiments a method can modify color associated with a source environment for presentation as a modified color at a target environment. The method can include applying different non-linear functions to transform subsets of data representing a color of a sample at the source environment into transformed subsets of data, and generating data representing a chroma correlate as an appearance correlate independent of data representing a hue-related correlate. The chroma correlate can be configured to generate the color at a device at the target environment.

BRIEF DESCRIPTION OF THE FIGURES

The invention and its various embodiments are more fully appreciated in connection with the following detailed description taken in conjunction with the accompanying drawings, in which.

Like reference numerals refer to corresponding parts throughout the several views of the drawings. Note that most of the reference numerals include one or two left-most digits that generally identify the figure that first introduces that reference number.

DETAILED DESCRIPTION

Figure 1:
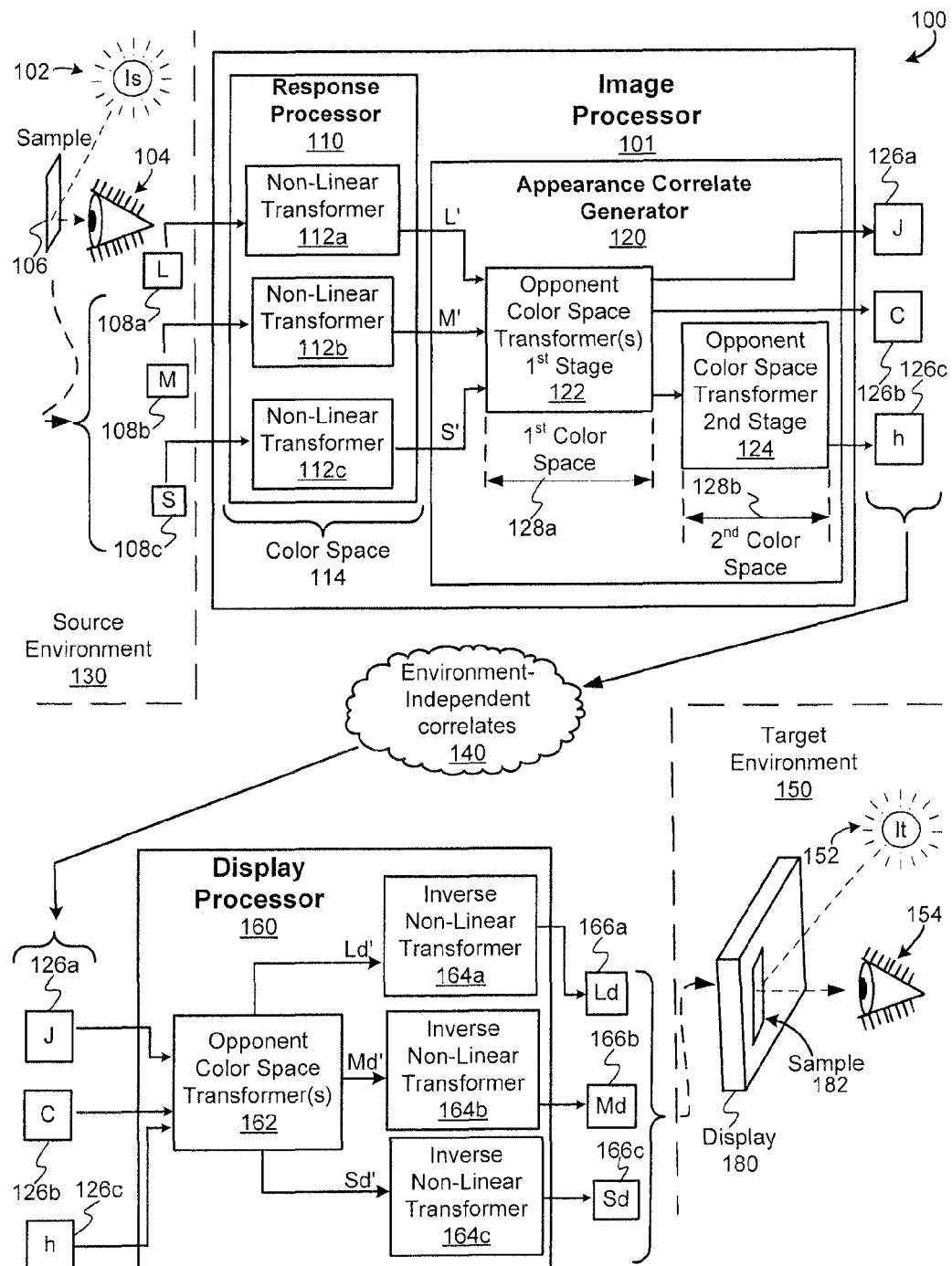
FIG. 1 is a diagram illustrating an example of a system for modifying color captured at a source environment so that the color can be reproduced as the color at a target environment, according to at least some embodiments of the invention.

FIG. 1 is a diagram illustrating an example of a system for modifying color captured at a source environment so that the color can be reproduced as a matching color at a target environment, according to at least some embodiments of the invention. System 100 can include an image processor 101 configured to process data associated with a source environment 130 and a display processor 160 configured to display the color at a target environment 150. At source environment 130, a visual system 104—whether biological (e.g., based on the human visual system) or an image capture device—can perceive or determine the color as a function of the chromacity and/or luminance levels of a source illuminant ("Is") 102 and the characteristics of sample 106. Image processor 101 and display processor 160 can be configured to compensate for viewing conditions at target environment 150 that can include a target illuminant ("Is") 152 and a display device 180 configured to generate the color for sample 182. In particular, display processor 160 can be configured to modify the color to adapt to target environment 150 so that a visual system 154 can determine that the color for sample 182 is a corresponding color for sample 106 in source environment 130.

Image processor 101 can include a response processor 110 that can be configured to determine cone responses for the color of sample 106 in a color space, such as a cone color space. Image processor 101 also can include an appearance correlate generator 120 configured to generate appearance correlates, including a lightness correlate ("J") 126a, a chroma correlate ("C") 126b, and a hue correlate ("h") 126c. Image processor 101 can be configured to receive subsets of data representing the color of sample 106, each subset of data constituting a color channel. In the example shown, response processor 110 can be configured to receive data representing the following color channel values in a cone color space: a long tristimulus value ("L") 108a, a medium tristimulus value ("M") 108b, and a short tristimulus value ("S") 108c, each of which is associated with the color of sample 106. Response processor 110 can include non-linear transformers 112a, 112b, and 112c that are configured to use different non-linear functions to transform long tristimulus value 108a, medium tristimulus value 108b, and short tristimulus value 108c into transformed subsets of data each constituting a response value, such as L', M', and S', respectively. Appearance correlate generator 120 can include multiple color space transformations to generate at least one appearance correlate, such as a first opponent transformation in a first stage 122 and a second opponent transformation in a second stage 124. As shown, appearance correlate generator 120 can include first stage 122, which can have one or more opponent color space transformers, and a second stage 124, which can have one or more opponent color space transformers. To generate an appearance correlate that can be used to display the color in association with device 180 at target environment 150, at least one opponent color space transformer in first stage 122 can operate in a first color space 128a and at least one opponent color space transformer in second stage 124 can operate in a second color space 128b. In at least some embodiments, the generation of hue correlate 126c can be in parallel with the generation of chroma correlate 126c. Thus, the generation of chroma correlate 126b can be independent from the generation of hue correlate 126c.

In view of the foregoing, image processor 101 and at least some of its constituents can generate appearance correlates by, for example, determining cone responses using a color space. In some embodiments, response processors 110 can be configured to combine the performance of chromatic adaptation and non-linear response compression into a color space 114, such as the cone color space. In one or more embodiments, chromatic adaption can be incorporated into, for example, semi-saturation values of non-linear response compression operations. In some embodiments, each of non-linear transformers 112a, 112b, and 112c can use a transform operation to transform long tristimulus value 108a, medium tristimulus value 108b, and short tristimulus value 108c into transformed tristimulus values (i.e., a response values), such as L', M', and S'. In some embodiments, non-linear transformers 112a, 112b, and 112c each can be configured to operate independent of each other. For example, variations in operation of non-linear transformer 112a to non-linearly compress long tristimulus value 108a need not affect the non-linear response compression for medium tristimulus value 108b and short tristimulus value 108c. In some embodiments, non-linear transformers 112a, 112b, and 112c can be configured to respectively operate responsive to a long tristimulus value for a white point, a medium tristimulus value for the white point, and a short tristimulus value for the white point. In some embodiments, the long, medium and short tristimulus values for a white point can be used to provide for chromatic adaption. In some instances, the tristimulus values for the white point can represent an "adapting white," which can be a white point for an observer. In at least one embodiment, the white point can be an "adopted white point," which can be a computed white point. In some cases, the adapting white can be similar or equivalent to the adopted white point. Further, each of non-linear transformers 112a, 112b, and 112c can be configured to adjust data representing a white point associated with the color simultaneous (or substantially simultaneous to) to the scaling of intensity values associated with the color (e.g., the intensity values associated with the long, medium, and short tristimulus values) in color space 114. Appearance correlate generator 120 can include an opponent transformation in first stage 122 that can be configured to operate in a decorrelated color opponent space (not shown), which can be configured to accommodate the encoding of response values, such as L', M', and S'. In at least some embodiments, the decorrelated color opponent space in first stage 122 can include axes that need not coincide with the unique hues of red, green, yellow, and blue. Also, appearance correlate generator 120 can generate chroma correlate 126b independent of hue correlate 126c, or other hue-related correlates or parameters, such as a hue angle. Further, appearance correlate generator 120 need not determine an eccentricity parameter for generating chroma correlate 126b.

As shown, appearance correlate generator 120 can be configured to generate appearance correlates, including lightness correlate 126a, chroma correlate 126b, and hue correlate 126c, as well as other appearance correlates, at least some of which are environment-independent correlates 140. In particular, environment-independent correlates 140 can be independent of, for example, a display device 180 or an illuminant other than a reference illuminant that can be independent of the white points associated with source illuminant 102 and target illuminant 152.

Display processor 160 can be configured to display the color of sample 182 that can perceptually match the color of sample 106. Display processor 160 can include one or more opponent color space transforms 162 that are configured to generate modified subsets of data representing the color (e.g., response values Ld', Md', and Sd' and/or tristimulus values Xd', Yd', and Zd', which are not shown) at target environment 150 based on appearance correlates 126a to 126c. For example, one or more opponent color space transforms 162 can be configured to transform appearance correlates 126a, 126b, and 126c into transformed tristimulus values, such as response values Ld', Md', and Sd'. The lower case or subscript "d" specifies a value or parameter at the display (or destination) in target environment 150. Display processor 160 also can include inverse non-linear transformers 164a, 164b, and 164c that are configured to respectively use different inverse non-linear functions to transform response values Ld', Md', and Sd' into a long tristimulus value ("Ld") 166a, a medium tristimulus value ("Md") 166b, and a short tristimulus value ("Sd") 166c. In some embodiments, inverse non-linear transformers 164a, 164b, and 164c can operate to perform inverse operations of the transforms functions used by non-linear transformers 112a, 112b, and 112c. As shown, inverse non-linear transformers 164a, 164b, and 164c each can operate independent of each other, according to some embodiments. Further, inverse non-linear transformers 164a, 164b, and 164c can operate responsive to respective subsets of data representing tristimulus values for a white point associated with target environment 150. In some embodiments, inverse non-linear transformers 164a, 164b, and 164c can be configured to decompress the ranges of intensity levels associated with response values to increase the ranges of intensity levels for long tristimulus value 166a, medium tristimulus value 166b, and short tristimulus value 166c. The term "tristimulus value" can be referred to, at least in some embodiments, as a channel or a component of a set of tristimulus values. For example, data representing tristimulus value X (or L) can be described as data representing a channel or a component of a set of (or a triplet of) tristimulus values X, Y, Z (or L, M, S).

As used herein, the term "sample" can refer, in some embodiments, to an object that can provide a stimulus, including color, that can be described in a set of tristimulus values, such as the tristimulus values of X, Y, and Z of the CIE XYZ color space. Note that the subsets of data that represent long tristimulus value 108a, medium tristimulus value 108b, and short tristimulus value 108c can be derived from the tristimulus values of X, Y, and Z for the color of the sample. The term sample can be used interchangeably with "patch," "stimulus," or "test." In some embodiments, the sample can be one or more pixels or sub-pixels. Further, a sample can constitute a portion of an image, such as a digital images including of any number of pixels. Thus, the structures and/or functions describe herein can be applied to one or more pixels as well as an image (e.g., a set of pixels constituting the image). An image can be composed of pixels each of which can be represented by pixel data, which can specify whether the image is a high dynamic range ("HDR") image, for example, by a number of bits describing ranges of luminance (or radiance) levels within ranges of 4 or more orders of magnitude. Some examples of an image (e.g., a still image or a frame of a video) captured at a source environment can be presented at a target environment include displayed images (e.g., displayed on a monitor or LCD displayed), and printed images (e.g., printed on a medium, such as paper). In various embodiments, one or more of the features described herein can be associate at either the pixel level, the local level (e.g., a group of pixels) as, for example, a local operator or appearance correlate, or the global level (e.g., the image) as, for example, a global operator or appearance correlate.

As used herein, the term "response value" can refer, in some embodiments, to a value that can be associated with a cone space transform (including an input into an inverse transform in the cones space). A response value can represent one value of a set of response values, the set of response values being, for example, tristimulus values describing transformed tristimulus values, such as transformed values of L, M, and S in cone color space (i.e., L', M', S', which can be transformed tristimulus values of L, M, and S). In some examples, response values can be similar to or equivalent to photoreceptor outputs (or models thereof). As used herein, the term "color" can refer, in some embodiments, to a perceived color associated with a spectral distribution of the color stimulus, as well as the viewing conditions (e.g., the size, shape, structure, and surround of the area in which the color stimulus originates). Color can also depend on an observer's visual system and its ability to adapt to different illuminants, among other things. The term color, according to some embodiments, can also refer to an amount (e.g., a measured amount) of spectrally weighted photons emanating from a surface of, for example, a display device. In some embodiments, non-linear transformers 112a, 112b, and 112c and non-linear transformers 164a, 164b, and 164c can be implemented as spatially separate transformers to perform transform functions in parallel. In some embodiments, one or more of non-linear transformers 112a, 112b, and 112c and non-linear transformers 164a, 164b, and 164c can be implemented using temporally separate transformers. For example, non-linear transformers 112a, 112b, and 112c can be formed as one non-linear transformer that can operate to be configured (and reconfigured) to perform different functions to transform each of long tristimulus value 108a, medium tristimulus value 108b, and short tristimulus value 108c at different times.

Figure 2:
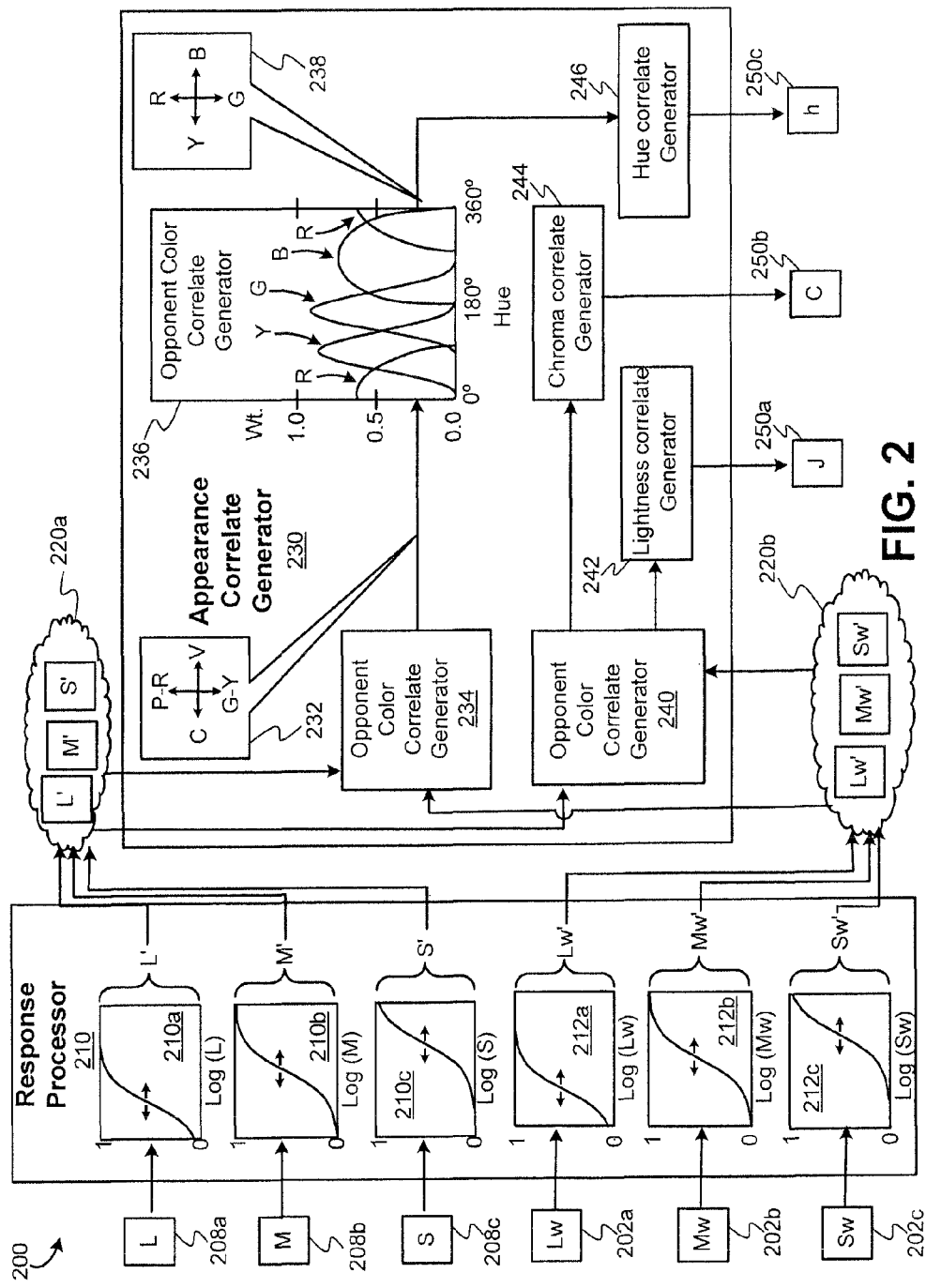
FIG. 2 is an example of an image processor configured to generate appearance correlates, according to at least some embodiments of the invention.

FIG. 2 is an example of an image processor 200 configured to generate appearance correlates, according to at least some embodiments of the invention. Image processor 200 includes a response processor 210 and an appearance correlate generator 230. Response processor 210 includes non-linear transformers 210a, 210b, 210c, 212a, 212b, and 212c that can be configured to perform either chromatic adaption or non-linear response compression, or both. Non-linear transformers 210a, 210b, and 210c are configured to operate on subsets of data representing a color of a sample, whereas non-linear transformers 212a, 212b, and 212c can be configured to operate on subsets of data representing a white point associated with a source environment (e.g., a white point related to a source illuminant). As shown, non-linear transformers 210a, 210b, and 210c can be configured to receive a long tristimulus value 208a, a medium tristimulus value 208b, a short tristimulus value 208c for the color and to respectively generate subsets of data representing response values 220a, such as response values L', M', and S'. Non-linear transformers 212a, 212b, and 212c can be configured to receive a long white point tristimulus value 202a, a medium white point tristimulus value 202b, a short white point tristimulus value 202c for the white point, and to respectively generate subsets of data representing response values 220b, such as response values Lw', Mw', and Sw', for the white point.

In various embodiments, non-linear transformers 210a, 210b, 210c, 212a, 212b, and 212c can be any non-linear transform that can be configured to compress, for example, the ranges of intensity values (e.g., ranges of stimulus intensity) associated with a tristimulus value to generate a response that can simulate a photoreceptor response. Specifically, non-linear transformers 210a, 210b, and 210c can be configured to compress a first range that includes intensity values for tristimulus value L, a second range that includes intensity values for tristimulus value M, and a third range that includes intensity values for tristimulus value S, respectively. In some embodiments, non-linear transformers 210a, 210b, and 210c can be configured to respectively generate response values L', M', and S' as a function of corresponding subsets of data representing a white point. For example, non-linear transformers 210a, 210b, and 210c can operate responsive to long white point tristimulus value 202a, medium white point tristimulus value 202b, short white point tristimulus value 202c, respectively (not shown). In some embodiments, long tristimulus value ("L") 208a, a medium tristimulus value ("M") 208b, a short tristimulus value ("S") 208c can be normalized to have values within a specific range of values. Thus, the tristimulus values L, M, and S each can be associated with an intensity value that specifies an amount of a relative intensity (e.g., an amount of energy) for the specific channel or component (i.e., of any of L, M, or S). In some cases, an intensity value can be expressed as a portion or a percentage of a maximum value of intensity. As luminance can be determined from a weighted average of the tristimulus values L, M, and S, the term "intensity value" can also refer to a portion of luminance, according to some embodiments. To illustrate, consider that non-linear transformers 210a, 210b, and 210c are configured to compress intensity values associated with tristimulus values L, M, and S in a range, for example, from 0 to 100, into response values L', M', and S' having values in a compressed range, for example, from 0.0 to 1.0.

In some embodiments, any of non-linear transformers 210a, 210b, 210c, 212a, 212b, and 212c can be sigmoid transformers configured to operate in accordance with a sigmoid function or its equivalents (e.g., logistic functions, etc.). In one or more embodiments, sigmoidal compression can approximate photoreceptor responses (e.g., and behavior). For example, non-linear transformers 210a, 210b, 210c, 212a, 212b, and 212c can operate in accordance with an "S-shaped" relationship between the log of an intensity value associated with an input (e.g., log(L)) and a response output (e.g., 0 to 1). In some embodiments, a sigmoid transformer can be configured to operate in accordance with the following relationship: $V=L^n/(L^n+\sigma^n)$, where "n" can be a positive constant, which can be less than 1.0. The value n can determine the steepness of the S-shaped relationship. The symbol "V" can represent the response value and is a function of "L," which can represent the incident luminance and "σ," which can represent a semi-saturation value. According to some embodiments, the S-cone channel can be modeled to operate according to the following relationship: $VS=S^n/(S^n+f(Sw)^n)$, with the M-cone and L-cone channels being determined in a similar manner.

In one or more embodiments, the semi-saturation value can be modified to configure the adaptive processes of a nonlinear transformer to compress intensity levels (or values) for a specific channel (i.e., either L, M, or S tristimulus values). In some embodiments, a semi-saturation value, o, can be a function of an illuminant, such as a source illuminant. For example, a semi-saturation value, o, can be a function of one of the tristimulus values for a white point of the illuminant. Thus, semi-saturation values σL, σM, and σS respectively can be functions of long white point tristimulus value 202a, medium white point tristimulus value 202b, and short white point tristimulus value 202c. In at least some embodiments, the semi-saturation constant can also be a function of a degree of adaption, D, which can be used to distinguish between reflective and self-luminous surfaces that can cause the human visual system to adapt differently. In some examples, a semi-saturation constant can be computed with a function, "f," which is $f(Sw)=[(D)(Sw)+(1-D)]^n$. The function f depends on an illuminant (e.g., a white point Lw, Mw, and Sw) and the degree of adaptation D. When non-linear transformers 210a, 210b, and 210c are configured as sigmoid transformers that respectively use semi-saturation values σL, σM, and σS, non-linear transformers 210a, 210b, and 210c can operate in a channel-independent manner (e.g., to emulate the steady-state behavior of photoreceptors), while simultaneously (or substantially simultaneously) providing for chromatic adaptation.

Appearance correlate generator 230 can be configured to receive data representing response values 220a, which includes response values L', M', and S', and data representing response values 220b, which includes response values Lw', Mw', and Sw'. Appearance correlate generator 230 also can be configured to receive parameters from a source environment to generate appearance correlates. Such parameters can be measured, computed, predicted, or can otherwise provided to appearance correlate generator 230. Further, appearance correlate generator 230 can be configured to generate a lightness correlate ("J") 250a, a chroma correlate ("C") 250b, and a hue correlate ("h") 250c, as well as other appearance correlates.

Appearance correlate generator 230 is shown to include an opponent color correlate generator 234, an opponent color correlate generator 236, an opponent color correlate generator 240, a lightness correlate generator 242, a chroma correlate generator 244, and a hue correlate generator 246. Opponent color correlate generator 234 can be configured to transform the transformed subsets of data representing the color to form data representing a set of opponent values. For example, opponent color correlate generator 234 can be configured to transform response values L', M', and S' to generate opponent color correlates (e.g., opponent color correlates ah, bh). In some embodiments, opponent color correlate generator 234 can generate opponent color correlates using a color space 232 that includes an opponent color correlate (e.g., ah) that includes a pinkish-red ("P-R") (or a substantially pinkish-red) and greenish-yellow ("G-Y") (or a substantially greenish-yellow) and another opponent color correlate (e.g., bh) that includes a cyan ("C") (or a substantially cyan) and a violet ("V") (or a substantially violet). As shown, color space 232 includes one axis with pinkish-red and greenish-yellow at respective extremes on the axis, and another axis with a cyan and a violet at respective extremes on the axis. In some cases, color space 232 includes a set of axes that can be oriented away from a color space with opponent red-green and blue-yellow axes.

Opponent color correlate generator 236 can be configured to transform the set of opponent color correlates in color space 232 to form data representing another set of opponent color correlates. In some embodiments, opponent color correlate generator 236 can be configured to reorient the axes of color space 232 to the axes of color space 238, which can be a color space with hues red, green, yellow and blue (i.e., opponent colors with red-green and blue-yellow axes). In some embodiments, opponent color correlate generator 236 can generate opponent color correlates using a color space 238 that includes an opponent color correlate (e.g., a") for a red ("R") color (or a substantially red color) and a green ("G") color (or a substantially green color) and another opponent color correlate (e.g., b") for a blue ("B") color (or a substantially blue color) and a yellow ("Y") color (or a substantially yellow color). As shown, color space 238 includes one axis with a red color and a green color at the extremes, and another axis with a blue color and a yellow color at the extremes. Hue correlate generator 246 can be configured to generate hue correlate 250c based on data generated by opponent color correlate generators 234 and 236 in multiple color spaces, according to some embodiments.

In one or more embodiments, opponent color correlate generator 236 can be further configured to sharpen an intermediate hue correlate for the subsequent determination of hue correlate 250c. For example, the intermediate hue correlate can be passed through one or more exponentiated sinusoid functions to create four new axes: $a_i=[k_i][\cos^{m_i}(s_i-h)]$, with i ranging from 1 to 4. The amount of sharpening can be determined by positive exponent "$m_i$," whereas the values of $s_i$ can specify the offset for the new axes orientations. Value $k_i$ can provide a relative amplitude. In color space 238, the hue correlate can be computed as follows: $h'=\tan-1[(a4-a2)/(a3-a1)]$, with a1 to a4 being determined above. In at least one embodiment, the values for $k_i$, $s_i$, and $m_i$ can be modified to vary the sinusoidal sharpening for opponent color correlate generator 236 so that appearance correlates, including hue correlate 250c, can optimally match datasets, such as one or more data sets from the LUTCHI dataset. In some embodiments, opponent color correlate generator 236 can operate with colors perceived in a specific context (i.e., related colors) rather than with colors that might otherwise be out of context (i.e., unrelated colors).

Opponent color correlate generator 240 can be configured to transform the transformed subsets of data representing the color and the white point to form data representing parameters configured to generate lightness correlate 250a and chroma correlate 250b. For example, opponent color correlate generator 240 can be configured to transform response values 220a (e.g., L', M', and S') and response values 220b (e.g., Ld', Md', and Sd') to generate a set of parameters that can be used by lightness correlate generator 242 to form lightness correlate 250a. As another example, opponent color correlate generator 240 can be configured to transform response values 220a (e.g., L', M', and S') to generate another set of parameters, including a set of opponent color correlates (e.g., ac, bc) that can be used by chroma correlate generator 244 to form chroma correlate 250b. As shown in FIG. 2, the generation of chroma correlate 250b can be performed independent from the generation of hue correlate 250c.

Figure 3:
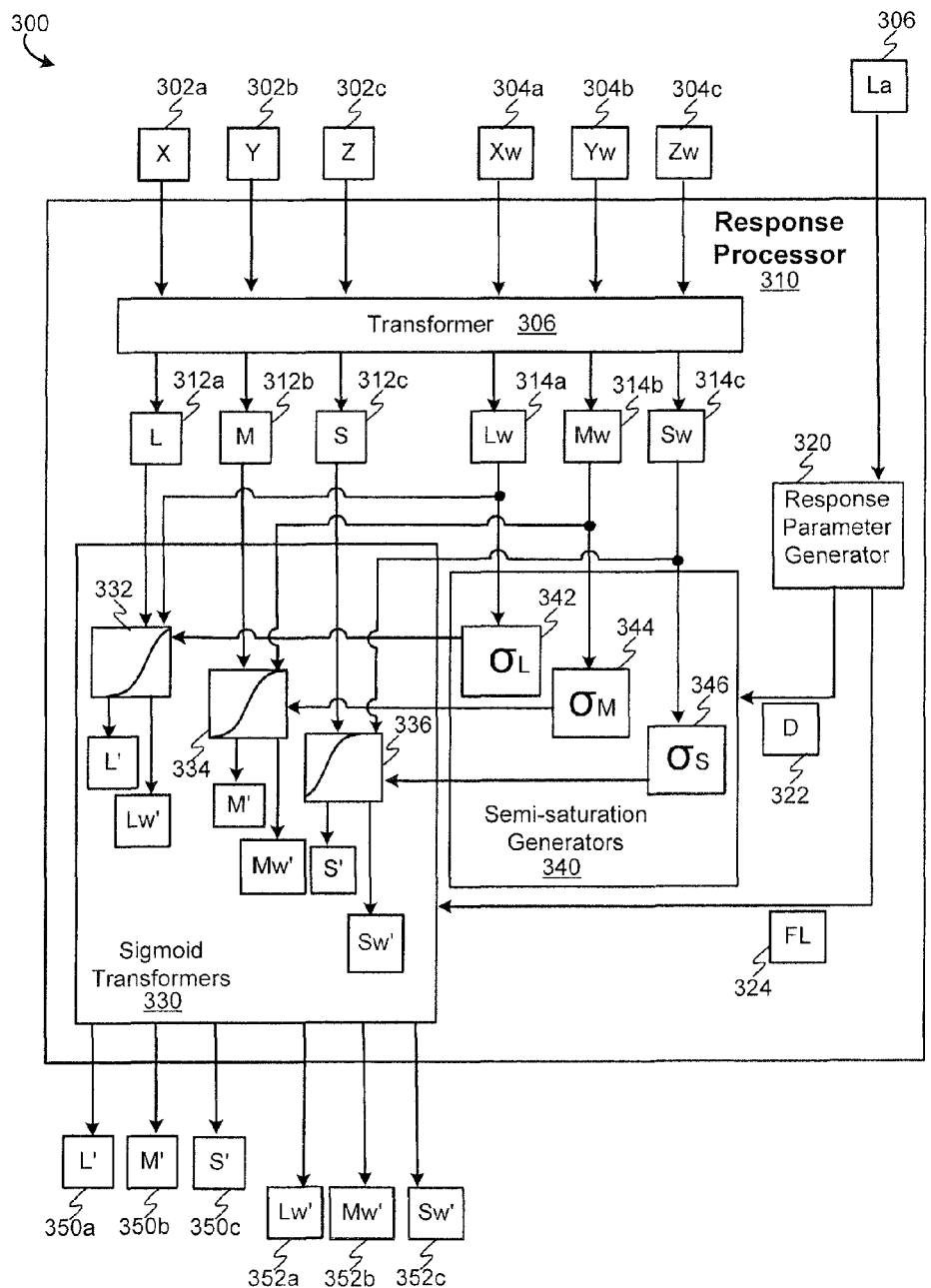
FIG. 3 is a diagram depicting an example of a response processor, according to at least some embodiments of the invention.

FIG. 3 is a diagram 300 depicting an example of a response processor, according to at least some embodiments of the invention. Response processor 310 can include a transformer 306, a response parameter generator 320, sigmoid transformers 330, and semi-saturation generators 340. Diagram 300 shows response processor 310 being configured to receive tristimulus values for a color for a sample at a source environment, and further configured to receive tristimulus values for a white point for a source illuminant. For example, tristimulus values for the color can include a tristimulus color value ("X") 302a, a tristimulus color value ("Y") 302b, and a tristimulus color value ("Z") 302c, and the tristimulus values for the white point can include a tristimulus white point value ("Xw") 304a, a tristimulus white point value ("Yw") 304b, and a tristimulus white point value ("Zw") 304c. A transformer 306 can be configured to generate tristimulus values for the color and the white point in a cone color space (e.g., an LMS cone space). For example, transformer 306 can be configured to transform tristimulus color value 302a, tristimulus color value 302b, and tristimulus color value 302c respectively into a long tristimulus color value ("L") 312a, a medium tristimulus color value ("M") 312b, and a short tristimulus color value ("S") 312c. Similarly, transformer 306 can be configured to transform tristimulus color value 304a, tristimulus color value 304b, and tristimulus color value 304c into a long tristimulus white point value ("Lw") 314a, a medium tristimulus white point value ("Mw") 314b, and a short tristimulus white point value ("Sw") 314c, respectively. In some embodiments, transformer 306 can use the transform of equation (1). Note that while equation (1) depicts the transform of XYZ tristimulus values, equation (1) can also transform XwYwZw tristimulus values.

$$\begin{bmatrix} L \\ M \\ S \end{bmatrix} = \begin{bmatrix} 0.3897 & 0.6890 & -0.0787 \\ -0.2298 & 1.1834 & 0.0464 \\ 0.0000 & 0.0000 & 1.0000 \end{bmatrix} \begin{bmatrix} X \\ Y \\ Z \end{bmatrix} \quad (1)$$

As shown, LMS tristimulus values 312a to 312c can be transmitted to respective sigmoid transformers 332, 334, and 336, and LwMwSw tristimulus values 314a to 314c can be transmitted to respective semi-saturation generators 342, 344, and 346. In some embodiments, semi-saturation generator 342 can operate in accordance with equation (2a), semi-saturation generator 344 can operate in accordance with equation (2b), and semi-saturation generator 346 can operate in accordance with equation (2c), where Lw, Mw, and Sw are the tristimulus values of the white point in the cone color space and "D" represents a degree of adaptation.

$$\sigma_L = 2588(D(L_W/100)+(1-D)) \quad (2a)$$

$$\sigma_M = 2588(D(M_W/100)+(1-D)) \quad (2b)$$

$$\sigma_S = 2588(D(S_W/100)+(1-D)) \quad (2c)$$

In some embodiments, response parameter generator 320 can generate parameter ("D") 322. The parameter of the degree of adaptation, D, can be influenced by the luminance of an adopted white point to the degree that an observer adapts to that white point. The degree of adaptation, D, can be a function of both the "surround" (e.g., the field or area that can be described as peripheral to viewing a sample) and "La," which is a luminance of the adapting field 306 (e.g., in units of cd/m2). In some embodiments, the surround can be described as either "average," "dim," or "dark," which, in turn, can determine parameter values for F, c, and Nc, as shown in Table 1. Value F represents a factor to determine the degree of adaptation, value c specifies the impact of the surround, and value Nc is the chromatic induction factor.

TABLE 1

| Surround | F | c | $N_c$ |
| --- | --- | --- | --- |
| Average | 1.0 | 0.69 | 1.0 |
| Dim | 0.9 | 0.59 | 0.95 |
| Dark | 0.8 | 0.525 | 0.8 |

While the value of D can range from 0 (i.e., no adaptation) to either the adopted white point, or up to 1 (i.e., full adaptation), the value of D can be below 0.65, according to some embodiments, for a dark surround. The value of D can exponentially converge to 1 for an average surround. In some embodiments, response parameter generator 320 can generate D as follows in equation (3).

$$D = F - \left(\frac{F}{3.6}\right)\exp\left(\frac{-L_a-42}{92}\right) \quad (3)$$

F can be determined from Table 1. In some embodiments, the luminance of the adapting field ("La") 306 can be received from the source environment, as either an automatic or manually measured value, or the luminance of the adapting field ("La") 306 can be generate by computation or prediction (e.g., by a computing device, such as an image processor 101 of FIG. 1). In some embodiments, the luminance of the adapting field ("La") 306 can be set to about 20% of the luminance value of a white object that is not a light source.

Semi-saturation generators 342, 344, and 346 can respectively transmit semi-saturation values σL, σM, and σS to sigmoid transformers 332, 334, and 336, which, in turn, can perform non-linear response compression to generate transformed tristimulus values (or response values) L', M', and S'. In some embodiments, sigmoid transformer 332 can operate in accordance with equation (4a), sigmoid transformer 334 can operate in accordance with equation (4b), and sigmoid transformer 336 can operate in accordance with equation (4c) as follows.

$$L' = 400 \frac{(F_L L/100)^{0.42}}{(F_L L/100)^{0.42} + \sigma_L^{0.42}} + 0.1 \qquad (4a)$$

$$M' = 400 \frac{(F_L M/100)^{0.42}}{(F_L M/100)^{0.42} + \sigma_M^{0.42}} + 0.1 \qquad (4b)$$

$$S' = 400 \frac{(F_L S/100)^{0.42}}{(F_L S/100)^{0.42} + \sigma_S^{0.42}} + 0.1 \qquad (4c)$$

As an example, consider that sigmoid transformer 332 receives parameter ("FL") 324 from response parameter generator 320, long tristimulus color value ("L") 312a, and semi-saturation value σL. With these input values, sigmoid transformer 332 can generate transformed tristimulus value ("L'") 350a as a response value. Similarly, sigmoid transformer 334 and sigmoid transformer 336 can generate transformed tristimulus values ("M'") 350b and ("S'") 350c, respectively, as response values for the color. Note that sigmoid transformers 332, 334, and 336 can be configured to receive long tristimulus white point value ("Lw") 314a, medium tristimulus white point value ("Mw") 314b, and short tristimulus white point value ("Sw") 314c, respectively, for substitution into equations (4a), (4b), and (4c) to replace the tristimulus color values shown in those equations (i.e., LMS tristimulus values). Thus, sigmoid transformers 332, 334, and 336 can be configured to generate transformed tristimulus values ("Lw'") 352a, ("Mw'") 352b, and ("Sw'") 352c, respectively, as response values for the white point. In some embodiments, response parameter generator 320 can generate parameter ("FL") 324 in accordance with equation (5), which can use equation (6) to determine the value of k.

$$F_L = 0.2k^4(5L_A) + 0.1(1-k^4)^2(5L_A)^{1/3} \qquad (5)$$

$$k = 1/(5L_A + 1) \qquad (6)$$

Figure 4:
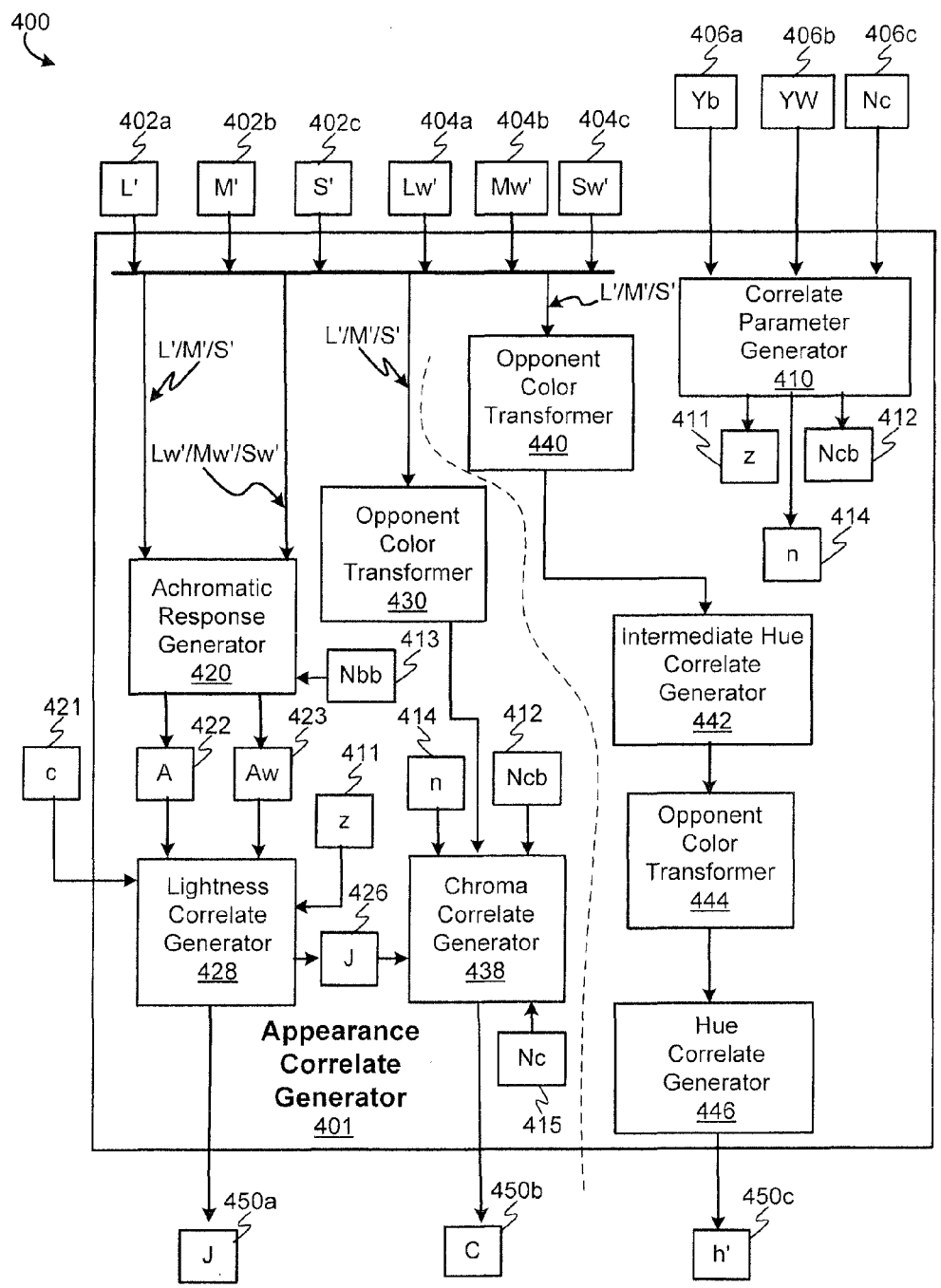
FIG. 4 is a diagram depicting an example of an appearance correlate generator, according to at least some embodiments of the invention.

FIG. 4 is a diagram 400 depicting an example of an appearance correlate generator, according to at least some embodiments of the invention. Appearance correlate generator 401 can include a correlate parameter generator 410, an achromatic response generator 420, a lightness correlate generator 428, an opponent color transformer 430, a chroma correlate generator 438, an opponent color transformer 440, an intermediate hue correlate generator 442, an opponent color transformer 444, and a hue correlate generator 446. Diagram 400 shows appearance correlate generator 401 being configured to receive transformed tristimulus values (e.g., response values) for a color for a sample at a source environment, and further configured to receive transformed tristimulus values (e.g., response values) for a white point for a source illuminant. For example, tristimulus values for the color can include a transformed tristimulus color value ("L'") 402a, a transformed tristimulus color value ("M'") 402b, and a transformed tristimulus color value ("S'") 402c, and the transformed tristimulus values for the white point can include a transformed tristimulus white point value ("Lw'") 404a, a transformed tristimulus white point value ("Mw'") 404b, and a transformed tristimulus white point value ("Sw'") 404c.

Correlate parameter generator 410 can be configured to receive a relative luminance factor of the background ("Yb") 406a, a relative luminance ("YW") 406b of the reference white in the adapting field at the source environment, and chromatic induction factor ("Nc") 406c (e.g., see Table 1 above). Further, correlate parameter generator 410 can be configured to generate parameter ("n") 414, parameter ("z") 411, and parameter ("Ncb") 412. Parameter ("n") 414 can be described as the background induction factor and can be a function of the luminance factor of the background (i.e., Yb). Parameter ("z") 411 can be described as a base exponential of nonlinearity, and parameter ("Ncb") 412 can be described as a chromatic background factor. Note that in some embodiments, parameter ("Ncb") 412 can be equivalent to a brightness background factor ("Nbb") 413. In some embodiments, correlate parameter generator 410 can be configured to generate parameter 414, parameter 412, and parameter 411 as set forth in equations (7), (8), and (9) as follows.

$$n = \frac{Y_b}{Y_W} \qquad (7)$$

$$N_{bb} = N_{cb} = 0.725\left(\frac{1}{n}\right)^{0.2} \qquad (8)$$

$$z = 1.48 + \sqrt{n} \qquad (9)$$

Achromatic response generator 420 can be configured to receive transformed tristimulus color values 402a to 402c, transformed tristimulus white point values 404a to 404c, and parameter ("Nbb") 413, and can be further configured to generate data representing an achromatic response ("A") 422 for the color of the sample, as well as data representing an achromatic response ("Aw") 423 for the white point of the source illuminant Achromatic response 422 and achromatic response 423 can be determined, at least in some embodiments, in accordance with equations (10) and (11). Note that the numeric values in equations (10) and (11) are examples, as is other numeric values disclosed herein, and can be modified. Thus, the numeric values described herein are not intended to be limiting.

$$A = N_{bb}(4.19L' + M' + 1.17S') \qquad (10)$$

$$A_W = N_{bb}(4.19L'_W + M'_W + 1.17S'_W) \qquad (11)$$

Lightness correlate generator 428 can be configured to receive data representing achromatic response 422, achromatic response 423, parameter ("c") 421 (e.g., from Table 1), and parameter 411, from which lightness correlate generator 428 can generate data representing lightness correlate ("J") 450a. In some embodiments, lightness correlate generator 428 can operate in accordance with equation (12).

$$J = 106.5(A/A_W)^{cz} \qquad (12)$$

Opponent color transformer 430 can be configured to receive transformed tristimulus color values 402a to 402c, and can be further configured to generate data representing opponent color correlates "ac" and "bc," as well as a normalization constant "d." In some embodiments, opponent color transformer 430 can operate in accordance with equation (13).

$$\begin{bmatrix} a_c \\ b_c \\ d \end{bmatrix} = \begin{bmatrix} -4.5132 & 3.9899 & 0.5233 \\ -4.1562 & 5.2238 & -1.0677 \\ 7.3984 & -2.3007 & -0.4156 \end{bmatrix} \begin{bmatrix} L' \\ M' \\ S' \end{bmatrix} \quad (13)$$

Data representing opponent color correlates "ac," "bc," and normalization constant "d" can be passed to chroma correlate generator 438, which can be configured to also receive parameter ("Nc") 415 (e.g., from Table 1), parameter ("Ncb") 412, parameter ("n") 414, and lightness correlate ("J") 450a. According to some embodiments, chroma correlate generator 438 can generate an intermediate parameter, "t," in accordance with equation (14), with which chroma correlate generator 438 can generate chroma correlate ("C") 450b in accordance with equation (15). Note that hue correlate 450c is absent in equations (10) to (15), through which chroma correlate ("C") 450b can be determined.

$$t = \frac{\left(N_c N_{cb} \sqrt{a_c^2 + b_c^2}\right)}{d} \quad (14)$$

$$C = (10^3 t)^{0.9} \sqrt{\frac{J}{100}} (1.64 - 0.29^n)^{0.73} \quad (15)$$

Opponent color transformer 440 can be configured to receive transformed tristimulus color values 402a to 402c, and can be further configured to generate data representing opponent color correlates "ah" and "bh." In some embodiments, opponent color transformer 440 can operate in accordance with equation (16) to generate opponent color correlates "ah" and "bh" in a color space that is different than that used, for example, by chroma correlate generator 438.

$$\begin{bmatrix} a_h \\ b_h \end{bmatrix} = \begin{bmatrix} -15.4141 & 17.1339 & -1.7198 \\ -1.6010 & -0.7467 & 2.3476 \end{bmatrix} \begin{bmatrix} L' \\ M' \\ S' \end{bmatrix} \quad (16)$$

In some embodiments, opponent color transformer 440 can generate opponent color correlates using a color space that includes an opponent color correlate (e.g., ah) that includes pinkish-red ("P-R") (or substantially pinkish-red) and greenish-yellow ("G-Y") (or substantially greenish-yellow) and another opponent color correlate (e.g., bh) that includes cyan ("C") (or substantially cyan) and violet ("V") (or substantially violet). One axis for the color space can be described in terms of coordinates (e.g., relative amounts) for pinkish-red and greenish-yellow at respective extremes of the axis, and another axis can be described in terms of coordinates (e.g., relative amounts) for cyan and violet at respective extremes of the other axis. In some embodiments, opponent color correlates ah and bh can represent a ganglion-derived decorrelated color space.

Intermediate hue correlate generator 442 can generate an intermediate hue correlate as set forth in equation (17).

$$h = \tan^{-1}\left(\frac{b_h}{a_h}\right) \quad (17)$$

Opponent color transformer 444 can be configured to receive the intermediate hue correlate, h, and can transform the intermediate hue correlate, h, into data representing opponent color correlates "a''" and "b''" for another color space. In some embodiments, opponent color correlates a'' and b'' are associated with a color space for perceptual hues (e.g., with opponent color axes red-green and blue-yellow). In various embodiments, opponent color transformer 444 can operate in accordance with equations (18) to (21) to transform opponent color correlates ah and bh into data that represents precursor values, which are used to generate opponent color correlates a'' and b''. In some embodiments, equations (18) to (21) can provide for the sharpening of the hue correlate.

$$r_p = \max(0, 0.6581 \cos^{0.5390}(9.1 - h)) \quad (18)$$

$$g_p = \max(0, 0.9482 \cos^{2.9435}(167.0 - h)) \quad (19)$$

$$y_p = \max(0, 0.9041 \cos^{2.5251}(90.9 - h)) \quad (20)$$

$$b_p = \max(0, 0.7832 \cos^{0.2886}(268.4 - h)) \quad (21)$$

The precursor values of rp, gp, yp, and by can be plotted against h to illustrate the functionality of opponent color transformer 444 for related colors, such as shown in opponent color generator 236 of FIG. 2. Next, opponent color transformer 444 can be configured to map the precursor values of rp, gp, yp, and by into the perceptual color opponent space to form red-green and yellow-blue pairs. Thus, opponent color transformer 444 can use equations (22) and (23) to perform the mapping, according to some embodiments.

$$a'' = r_p - g_p \quad (22)$$

$$b'' = y_p - b_p \quad (23)$$

Hue correlate generator 446 can use opponent color correlates "a''" and "b''" to generate hue correlate ("h'") 450c. According to some embodiments, hue correlate generator 446 can use equation (24) to generate hue correlate 450c.

$$h' = \tan^{-1}\left(\frac{b''}{a''}\right) \quad (24)$$

Figure 5:
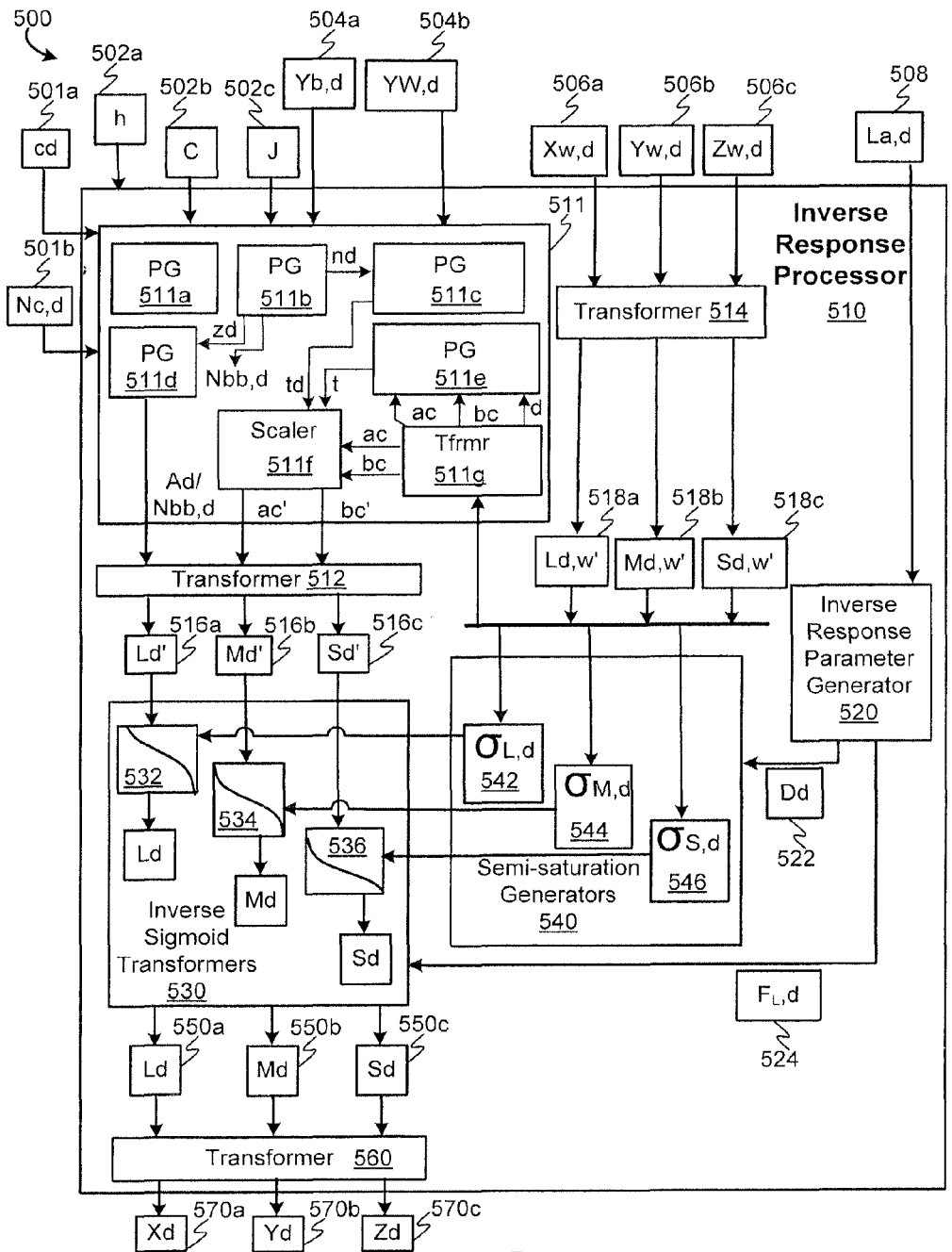
FIG. 5 is a diagram depicting an example of an inverse response processor, according to at least some embodiments of the invention.

FIG. 5 is a diagram 500 depicting an example of an inverse response processor 510, according to at least some embodiments of the invention. Inverse response processor 510 can include a precursor value generator 511, a transformer 512, a transformer 514, an inverse response parameter generator 520, inverse sigmoid transformers 530, semi-saturation generators 540, and a transformer 560. Diagram 500 shows inverse response processor 510 being configured to receive a hue correlate ("h") 502a, a chroma correlate ("C") 502b, and a lightness correlate ("J") 502c. In some embodiments, hue correlate ("h") 502a can be optional. Inverse response processor 510 also can be configured to receive tristimulus values for a white point for a target illuminant. For example, tristimulus values for the white point can include a tristimulus white point value ("Xw,d") 506a, a tristimulus white point value ("Yw,d") 506b, and a tristimulus white point value ("Zw,d") 506c. Further, inverse response processor 510 also can be configured to receive parameter ("cd") 501a, which specifies the impact of the surround at the target environment, a chromatic induction factor ("Nc,d") 501b associated with the target environment (e.g., see Table 1 above), a relative luminance factor of the background ("Yb,d") 504a for the target environment (e.g., a display environment), a relative luminance ("YW,d") 504b of the reference white in the adapting field at the target environment, and a luminance of the adapting field ("La,d") 508 associated with the target environment.

In some embodiments, inverse response parameter generator 520 can generate parameter ("D") 522 and parameter ("$F_L$,d") 524. The parameter of the degree of adaptation, D, can be influenced by the luminance of an adopted white point to the degree that an observer can adapt to that white point. Here, the observer point of reference is at the target environment. The degree of adaptation, D, can be a function of both the "surround" and "La,d" 508. In some embodiments, inverse response parameter generator 520 can generate parameter ("$F_L$,d") 524 in accordance with equation (5) and the value of La,d at the target environment. Equation (5) can use equation (6) to determine the value of k. In some embodiments, inverse response parameter generator 520 can generate D as set forth in equation (3), with parameter ("$F_L$,d") 524.

Transformer 514 can be configured to transform tristimulus white point values to form transformed tristimulus values (e.g., response values) for the white point associated with a target illuminant. For example, transformer 514 can be configured to transform tristimulus white point value 506a, tristimulus white point value 506b, and tristimulus white point value 506c respectively into a transformed tristimulus white point value ("Ld,w'") 518a, a transformed tristimulus white point value ("Md,w'") 518b, and a transformed tristimulus white point value ("Sd,w'") 518c. Opponent color transformer ("transformer") 511g can be configured to receive and to transform transformed tristimulus white point values 518a, 518b, and 518c into parameters, such as opponent color correlates "ac," and "bc," and normalization constant "d." In some embodiments, opponent color transformer 511g can operate in accordance with equation (13). Parameter generator ("PG") 511b can be configured to receive relative luminance factor of the background 504a, relative luminance of the reference white 504b, and further configured to generate parameter nd, parameter zd, and parameter Ncb, which can be equivalent to parameter Nbb,d. In some embodiments, parameter generator 511b can operate in accordance with equation (7) to generate parameter nd using values 504a and 504b, in accordance with equation (8) to generate parameters Ncb,d and Nbb,d, and in accordance with equation (9) to generate parameter zd. Parameter generator ("PG") 511c can be configured to receive chroma correlate 502b, and lightness correlate 502c, and parameter nd, and can be further configured to generate parameter td. In some embodiments, parameter generator 511c can operate in accordance with equation (25) to generate parameter td.

$$t_d = 10^{-3} \left( \frac{C}{\sqrt{J/100} \, (1.64 - 0.29^{y_{b_d}})^{0.73}} \right)^{1/0.9} \quad (25)$$

Scaler 511f can be configured to receive parameters t, td, ac,d and bc,d, and can be further configured to generate scaled opponent color correlate values. In some embodiments, scaler 511f can operate in accordance with equations (26a) and (26b) to generate parameters ac' and bc', respectively.

$$a'_c = a_c \frac{t_d}{t} \quad (26a)$$

$$b'_c = b_c \frac{t_d}{t} \quad (26b)$$

Parameter generator ("PG") 511a can be configured to receive parameter Nbb,d and transformed tristimulus white point values 518a, 518b, and 518c, and can be further configured to generate parameter Ad. In some embodiments, parameter generator 511a can operate in accordance with equation (11) to generate parameter Ad. Parameter generator ("PG") 511d can be configured to receive lightness correlate 502c, parameter cd, and parameter zd, and can be further configured to generate parameter Ad. In some embodiments, parameter generator 511d can operate in accordance with equation (27). Further, parameter generator 511d can provide the combined parameter of Ad/Nbb,d.

$$A_d = A_{d,w} \left( \frac{J}{106.5} \right)^{1/c_d z_d} \quad (27)$$

Transformer 512 can be configured to transform data representing parameters ac', bc', and Ad/Nbb,d into transform tristimulus color values to form transformed tristimulus values (e.g., response values) for the color associated with a sample at a target environment. For example, transformer 512 can be configured to transform parameters ac', bc', and Ad/Nbb,d into transformed tristimulus color value ("Ld'") 516a, transformed tristimulus color value ("Md'") 516b, and transformed tristimulus color value ("Sd'") 516c, respectively. In some embodiments, transformer 512 can operate in accordance with equation (28).

$$\begin{bmatrix} L'_d \\ M'_d \\ S'_d \end{bmatrix} = \begin{bmatrix} -4.5132 & 3.9899 & 0.5233 \\ -4.1562 & 5.2238 & -1.0677 \\ 4.19 & 1.00 & 1.17 \end{bmatrix}^{-1} \begin{bmatrix} a'_c \\ b'_c \\ A_d / N_{d,bb} \end{bmatrix} \quad (28)$$

As shown, transformed LMS tristimulus values 518a to 518c (e.g., response values) can be transmitted to respective semi-saturation generator 542, 544, and 546. In some embodiments, semi-saturation generator 542 can operate in accordance with equation (2a), semi-saturation generator 544 can operate in accordance with equation (2b), and semi-saturation generator 546 can operate in accordance with equation (2c), where Lw, Mw, and Sw are respectively replaced by transformed tristimulus white point values ("Ld,w'") 518a, ("Md,w'") 518b, and ("Sd,w'") 518c, and "D" represents a degree of adaptation at the target environment.

Semi-saturation generators 542, 544, and 546 can respectively transmit semi-saturation values σL,d, σM,d, and σS,d to inverse sigmoid transformers 532, 534, and 536, which, in turn, can perform inverse non-linear response compression to generate modified tristimulus values ("Ld") 550a, ("Md") 550b, and ("Sd") 550c in the cone color space. In some embodiments, sigmoid transformer 532 can operate in accordance with equation (29a), sigmoid transformer 534 can operate in accordance with equation (29b), and sigmoid transformer 536 can operate in accordance with equation (29c) as follows.

$$L_d = \frac{100}{F_{d,L}} \left( \frac{\sigma_{L_d}(L'_d - 0.1)}{400 - (L'_d - 0.1)} \right)^{1/0.42} \quad (29a)$$

$$M_d = \frac{100}{F_{d,L}} \left( \frac{\sigma_{M_d}(M'_d - 0.1)}{400 - (M'_d - 0.1)} \right)^{1/0.42} \quad (29b)$$

$$S_d = \frac{100}{F_{d,L}} \left( \frac{\sigma_{S_d}(S'_d - 0.1)}{400 - (S'_d - 0.1)} \right)^{1/0.42} \quad (29c)$$

In some embodiments, modified tristimulus values ("Ld") 550a, ("Md") 550b, and ("Sd") 550c are described as "modified" to indicate that the LMS tristimulus values associated with the target environment are modified over the LMS tristimulus values associated with the source environment. Transformer 560 can be configured to transform modified tristimulus values ("Ld") 550a, ("Md") 550b, and ("Sd") 550c into tristimulus values ("Xd") 570a, ("Yd") 570b, and ("Zd") 570c in the CIE XYZ color space or any other suitable color space.

Figure 6:
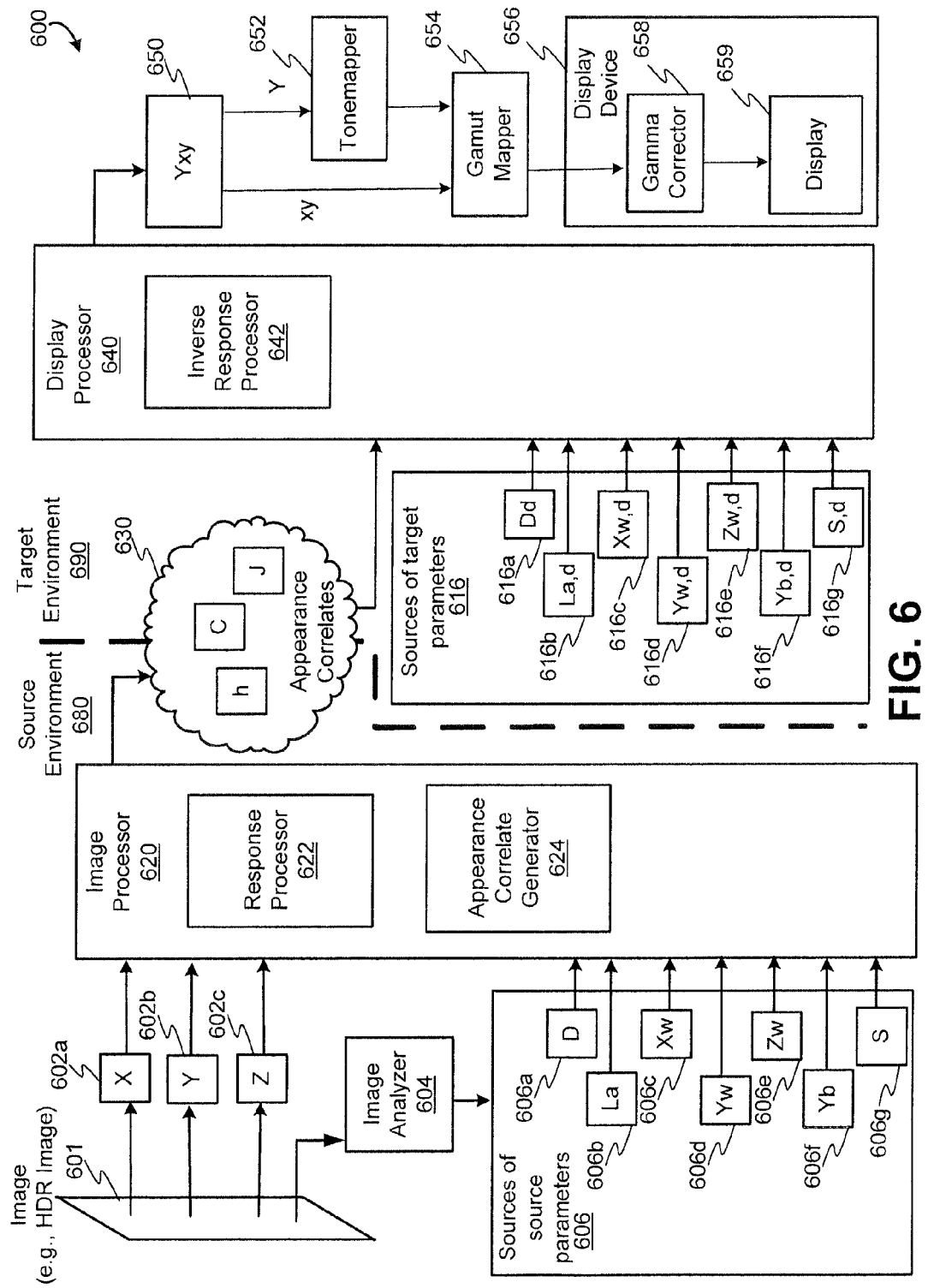
FIG. 6 depicts examples of an image processor and a display processor for facilitating color matching between different viewing conditions, according to various embodiments.

FIG. 6 depicts examples of an image processor and a display processor for facilitating color matching between different viewing conditions, according to various embodiments. As shown in diagram 600, an image processor 620 and a display processor 640 in association with a source environment 680 and a target environment, respectively. Image processor 620 can include a response processor 622 and an appearance correlate generator 624, and display processor 640 can include an inverse response processor 642, any of which can have structures and/or functionalities as described herein. Response processor 622, appearance correlate generator 624, and inverse response processor 642 can cooperate to match a color associated with, for example, an image 601 (and pixels thereof) to a corresponding color at display device 656 so that they are perceptibly the same, according to a human visual system, for example. An example of image 601 can be an HDR image. Image processor 620 can be implemented in hardware and/or software, and can be included in an image capture device, such as a camera, in a computing device, or in a communications device. Display processor 640 can be implemented in hardware and/or software, and can be included in or used in association with a CRT monitor, LCD display, a projection device, or any image display device.

Image processor 620 can be configured to generate appearance correlates 630 based on parameters associated with source environment 680. Image processor 620 can be configured to receive tristimulus values ("X") 602a, ("Y") 602b, and ("Z") 602c, as well as parameters 606a to 606g from one or more sources 606 of source parameters. Examples of source parameters include a degree of adaption ("D") 606a, a luminance of the adapting field ("La") 606b, tristimulus values for a source-side white point, such as values ("Xw") 606c, ("Yw") 606d, and ("Zw") 606e, a relative luminance factor of the background ("Yb") 606f, and a surround condition ("S") 606g, among other parameters. Any of these parameters can be measured either automatically (e.g., computer-aided parameter determination) or manually using colortiming or other equivalent processes and instruments. In one embodiment, an image analyzer 604 can be a processor-implemented device configured to analyze image 601 to determine any of parameters 606. For example, image analyzer 604 can be configured to detect whether data associated with a pixel relates to a light source or is a reflective surface. As such, image analyzer 604 can be configured to determine adaption ("D") 606a. In some cases, image analyzer 604 can determine tristimulus values ("X") 602a, ("Y") 602b, and ("Z") 602c and/or luminance of the adapting field ("La") 606b. Parameters 606 can be included with image 601 so that image processor 620 can access it, or the parameters 606 can be supplied separate from image 601. With respect to target environment 690, sources of target parameters 616 can be similarly determined Display processor 640 can generate xy chromaticity values 650 in, for example, the CIE xyY colorspace. Tonemapper 652 can be configured to map luminance levels for high dynamic ranges to luminance levels for low dynamic ranges, whereas gamut mapper 654 can be configured to adjust the color of image 601 to fit into the constrained color gamut of display device 656, which can be a CRT monitor, LCD display, a projection device, or any image display device. Display device 656 can include a gamma corrector 658 to correct for the nonlinear relationship between a pixel value and the displayed intensity for a monitor. Display device 656 can also include display 659 upon which colors for 601 can be reproduced.

As shown, diagram 600 depicts image processor 620 and display processor 640 being configured to match colors (e.g., by perceptibly matching colors) of HDR image 601 between a source environment 680 and a target environment. An HDR image 601 can be associated with a range of luminance levels that provide a greater amount of contrast between luminance levels than a low dynamic range. In some cases, an amount of contrast can be determined by the ratio between a higher (e.g., highest) luminance value and a lower (e.g., lowest) luminance value. Optionally, tonemapper 652 is shown to provide optional tone reproduction (or tone mapping) to subsequently compress a range of luminance values for HDR image 601 into a smaller range of luminance values to, for example, display image 601 using display device 656. Thus, display device 656 can be a low dynamic range ("LDR") device that is capable of providing for a low dynamic range of luminance values (e.g., about 2 to 3 orders of magnitude). In some embodiments, image processor 620 and display processor 640 can be configured to match colors while provide for expansion of range of luminance values associated with image 601. For example, consider that image 601 is associated with a low dynamic range of luminance values (e.g., about 2 to 3 orders of magnitude). In some embodiments, image processor 620 and display processor 640 (of FIG. 6 or otherwise described herein) can be configured to expand the range of luminance values from a low dynamic range of luminance values to a high dynamic range of luminance values (e.g., about 3 to 4 or more orders of magnitude) with or without color appearance matching as set forth herein. Thus, image processor 620 and display processor 640 can cooperate to provide, for example, the display of an image in HDR at a target environment, with the image being captured at a source environment using LDR technology.

Figure 7:
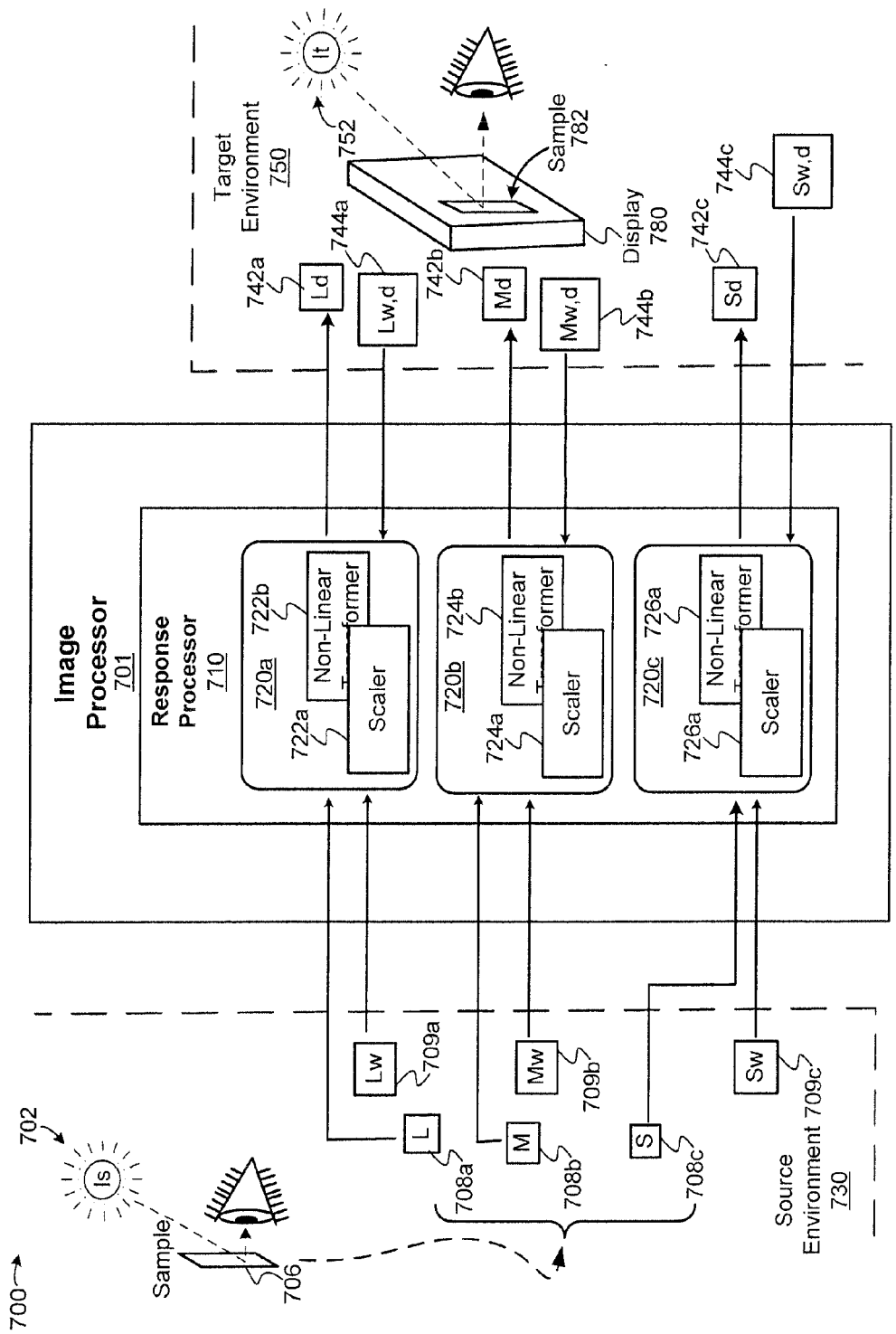
FIG. 7 is a diagram of an example of an image processor that includes another response processor, according to some embodiments of the invention.

FIG. 7 is a diagram 700 of an example of an image processor 701 that includes another response processor 710, according to some embodiments of the invention. Image processor 710 can be configured to process data associated with a source environment 730 so that the color produced at a target environment 750 can be perceptually the same as at sample 706. At source environment 730, illuminant ("Is") 702 and the characteristics of sample 706 can affect how the color is perceived in another viewing environment. Image processor 710 can be further configured to compensate for viewing conditions at target environment 750 that can include target illuminant ("Is") 752 and a display device 780 configured to generate the color for sample 782. As shown, image processor 701 can include response processor 710 that can be configured to determine cone responses (e.g., L, M, and S tristimulus values) for the color of sample 706 (or an image) in a color space, such as a cone color space, and can generate modified cone responses (e.g., Ld, Md, and Sd tristimulus values) for use in target environment 750. Response processor 710 can be configured to receive subsets of data representing the color of sample 706, each subset of data constituting a color channel. In the example shown, response processor 710 can be configured to receive data representing a long tristimulus value ("L") 708a, a medium tristimulus value ("M") 708b, and a short tristimulus value ("S") 708c, each of which is associated with the color of sample 706. Response processor 710 can include channel processors 720a, 720b, and 720c that are respectively associated with long tristimulus value 708a, medium tristimulus value 708b, and short tristimulus value 708c. Further, channel processors 720a, 720b, and 720c can be configured to generate long tristimulus value ("Ld") 742a, medium tristimulus value ("Md") 742b, and short tristimulus value ("Sd") 742c for target environment 750.

In view of the foregoing, response processor 710 and at least some of its constituents can perform color appearance matching concurrent (or substantially concurrent) with reducing the dynamic range of sample 706, thereby providing for tone mapping from an HDR 706 image to a LDR display 780. Thus, response processor 710 can be configured to perform combined tone reproduction (e.g., as a tone reproduction operator) and a color appearance compensation (e.g., in accordance with as a color appearance model). For example, response processor 710 can be configured to reduce a dynamic range of data representing the tristimulus values L, M, and S to generate modified tristimulus values Ld, Md, and Sd with a reduced range of intensity levels associated with the color. In at least some embodiments, response processor 710 can be configured to match colors between viewing environments without an inverse process to provide tristimulus values at the target environment. Thus, response processor 710 need not generate appearance correlates for matching the color of sample 782 to that of sample 706. In some cases, this can preserve computational resources. In some embodiments, response processor 710 can implement a color appearance model as a "forward only" color appearance model that can omit transforming source parameters with a subsequent inverse operation to transform out (e.g., from a reference space) to the target environment.

Channel processors 720a, 720b, and 720c are shown to respectively include a scaler 722a and a non-linear transformer 722b, a scaler 724a and a non-linear transformer 724b, and a scaler 726a and a non-linear transformer 726b. Further, channel processor 720a can be configured to receive long tristimulus value ("L") 708a, long tristimulus value ("Lw") 709a for a source white point, and a long tristimulus value ("Lw,d") 744a for a target white point. Channel processor 720b can be configured to receive medium tristimulus value ("M") 708b, a medium tristimulus value ("Mw") 709b for the source white point, and a medium tristimulus value ("Mw,d") 744b for the target white point. Channel processor 720c can be configured to receive a short tristimulus value ("S") 708c, a short tristimulus value ("Sw") 709c for the source white point, and a short tristimulus value ("Sw,d") 744c for the target white point.

In some embodiments, a non-linear transformer can be responsive to a tristimulus value (e.g., Lw,s, Mw,s, or Sw,s) for a source white point for the source illuminant, as well as to a tristimulus value (e.g., Lw,t, Mw,t or Sw,t) for a target white point for the target illuminant. For example, non-linear transformer 722a can be configured to respond to value ("Lw") 709a and to value ("Lw,d") 744a. In one embodiment, the channel processor operates responsive to a scaler, which, in turn, is configured to process the tristimulus value (e.g., Lw,s,) for the source white point and the tristimulus value (e.g., Lw,t) for the target white point. In particular, scalers 722a, 724a, and 726a can be configured to scale respective tristimulus values 708a, 708b, and 708c by ratios of tristimulus target white point values to tristimulus source white point values (e.g., ≈Lw,t/Lw,s).

In some embodiments, non-linear transformer 722b, non-linear transformer 724b, and non-linear transformer 726b each can be configured to transform channel data in accordance with sigmoid functions. In one embodiment, the sigmoid functions each is configured to be behave responsive to the tristimulus source white point value associated with the sigmoid function. In some embodiments, scalers 722a, 724a, and 726a can be configured to scale respective tristimulus values 708a, 708b, and 708c by ratios of a semi-saturation value for a target environment to a semi-saturation value for a source environment. An example of a non-linear function that can be implemented for non-linear transformer 722b, non-linear transformer 724b, and non-linear transformer 726b is shown in equation (30a), in which a sigmoid function can be configured to facilitate compression of an intensity range (e.g., dynamic range reduction). As shown in equation (30a), value "n" represents a value that determines the shape of the sigmoid response, and "σl" can represent a semi-saturation value that can associate an average luminance of an image to a middle level associated with a display range that includes a display value, Ld. As sigmoidal compression can be implemented to a model of photoreceptor output, the display value(s) Ld can be given in perceptual quantities.

$$L_d = \frac{L^n}{L^n + \sigma_1^n} \tag{30a}$$

To illustrate the application of the non-linear transformers of the channel processors to provide color appearance matching (as well as tone reproduction), consider that the human visual system can be modeled to include sigmoid functions, such as shown in equation (31). Equations (30b) to (33c) can demonstrate the efficacy of response processor 701, at least according to some embodiments. For example, note that a variable substitution set forth in equation (30b) can be made to remove an exponent "n," and to make display values Ld as a function of source values Ls. Note that the subscript "s" can denote values associated with the source environment. Further, this can provide for an operator (e.g., a tone reproduction operator) set forth in equation (30c).

$$L_s \leftarrow \sigma_1 \left(\frac{L}{\sigma_1}\right)^n \tag{30b}$$

$$L_d = \frac{L_s}{L_s + \sigma_1} \tag{30c}$$

An example of a second non-linear function can be another sigmoid function, as shown in equation (31), to facilitate compression as perceived by the human visual system. In some cases, the visual system can produce a photoreceptor response, V, which can be subsequently processed and interpreted by, for example, the remainder of the retina and the brain. The value "n" can represent a value that determines the shape of the sigmoid response, and semi-saturation value "σ2" can represent the state of adaptation of the observer at a target environment, which is a function of the illumination in the observer's environment.

$$V = \frac{L_d^n}{L_d^n + \sigma_2^n} \tag{31}$$

An example of nested sigmoid functions is depicted in equations (32a) and (32b), whereby display values, Ld, determined in equation (30c) are configured as inputs into equation (31), to generate photoreceptor responses, V, that accompanies dynamic range reduction. Note that in some embodiments, equation (31) can also represent a nested sigmoid function. In some embodiments, of the nesting of sigmoid functions includes a model of the HVS processes that provide for photoreceptor responses. In various embodiments, the value σ1 can represent the state of adaptation a human observer at a source environment, and the value σ2 can represent the state of adaptation of a human observer at a target (e.g., display) environment. Thus, a reverse or inverse computation can be omitted.

$$V = \frac{L_s^n}{L_s^n + \sigma_2^n (L_s + \sigma_1)^n} \tag{32a}$$

Note that since values of "σ1" can dominate values of Ls for a range of values that can occur in a viewing environment, a photoreceptor response, V, can be approximated by equation (32b).

$$V \approx \frac{L_s^n}{L_s^n + (\sigma_2 \sigma_1)^n} \tag{32b}$$

In some embodiments, additional conditioning can be applied to enhance the display of a sample (e.g., a pixel) and/or an image including a number of samples. To do so, the photoreceptor response can be presumed to be the same (or substantially equivalent) at both the source and target environments. As such, the photoreceptor response, V, can be approximated as shown in equation (33a).

$$V \approx \frac{L_s^n}{L_s^n + \sigma_1^n} \tag{33a}$$

A variable substitution, as set forth in equation (33b), can be implemented in equation (33a) to generate a photoreceptor response at the target environment that can simulate adaption at the source envrionment (σ1).

$$L_s \leftarrow \frac{\sigma_1}{\sigma_2} \left(\frac{L}{\sigma_1}\right)^n \tag{33b}$$

Inverting equation (33b) can lead to an expression, as set forth in equation (33c), that can be applied to an input stimulus (e.g., an input sample) or image, L. The scaled values, Lm, then can be applied to equation (30a) to yield a model that can produce displayable values that can be perceived correctly (or substantially correctly). The manipulation of values representing input image, L, facilitates the use of a sigmoidal transformer in "forward only" mode, while still retaining control over the source environment (e.g., through the use of σ1) as well as the target display environment (e.g., through the use of σ2).

$$L_m = \sigma_1 \left(\frac{L\sigma_2}{\sigma_1}\right)^{1/n} \tag{33c}$$

Incorporating equations (30a) and (33c) can provide for a color appearance model in combination with tone reproduction operations.

Note that response processor 701 can be configured to provide tone mapping from, for example, an HDR image to an LDR display, along with color appearance matching. In some embodiments, response processor 701 can be configured to provide expansion of a range of luminance values for an LDR image for use on a device configured to present the image as an HDR image, along with option color appearance matching.

Figure 8:
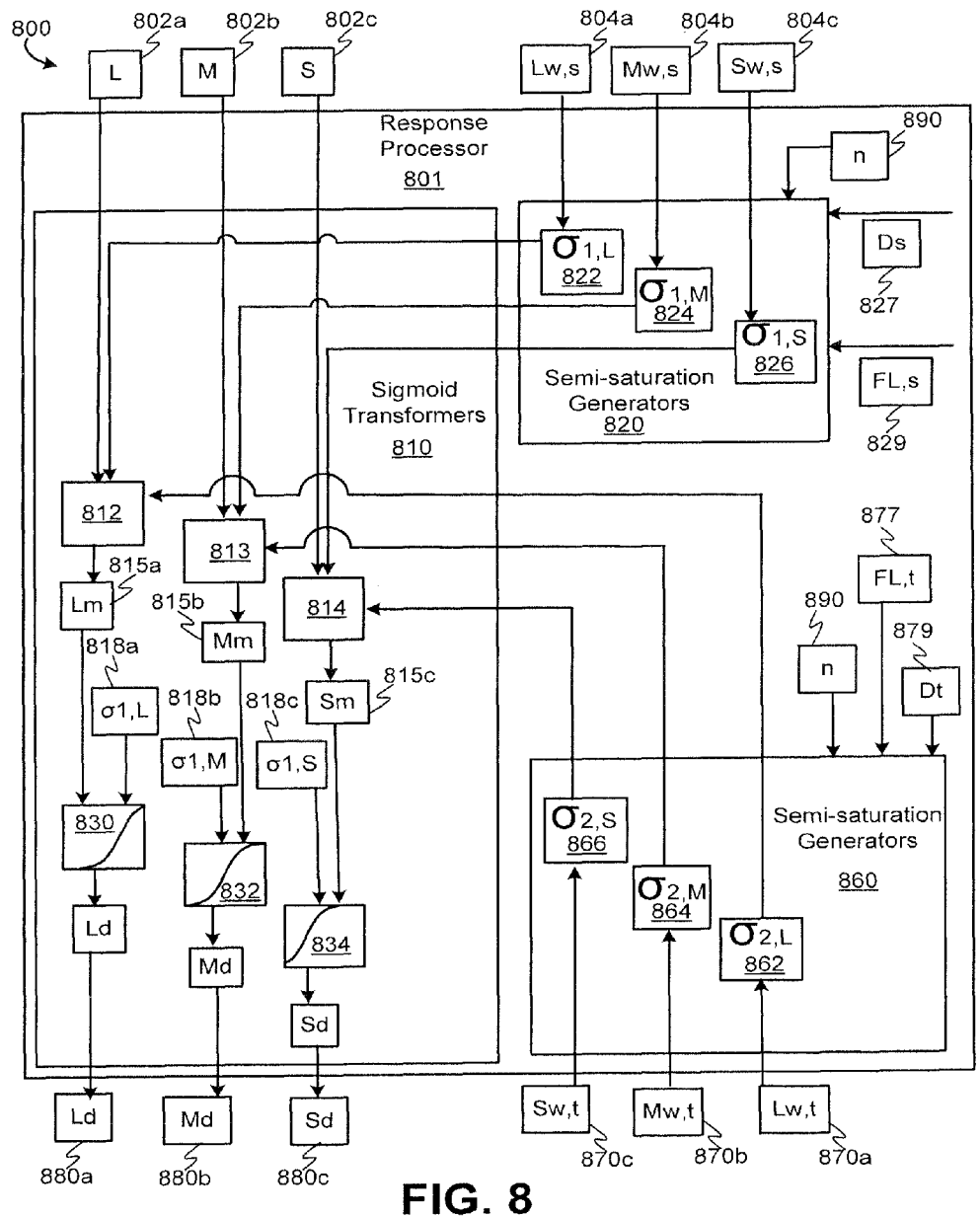
FIG. 8 is a diagram depicting an example of another response processor, according to at least some embodiments of the invention.

FIG. 8 is a diagram 800 depicting an example of another response processor, according to at least some embodiments of the invention. Response processor 801 can include sigmoid transformer 810, semi-saturation generators 820, and semi-saturation generators 860. Diagram 800 shows response processor 801 being configured to receive tristimulus values for a color for a sample at a source environment, and further configured to receive tristimulus values for a white point for a source illuminant. For example, tristimulus values for the color can include a long tristimulus color value ("L") 802$a$, a medium tristimulus color value ("M") 802$b$, and a short tristimulus color value ("S") 802$c$. The tristimulus values for the white point can include a long tristimulus white point value ("Lw,s") 804$a$, a medium tristimulus white point value ("Mw,s") 804$b$, and a short tristimulus white point value ("Sw,s") 804$c$.

In some embodiments, an input image can be specified in absolute values, measured in units of cd/m$^2$, prior to a color space, such as the XYZ space or equivalent space. An adaptation value, $L_{a,s}$, can be derived from the input image using log average luminance, such as set forth in equation (34).

$$L_{a,s} = \exp\left(\frac{1}{N}\sum_{i=1}^{N}\log(\epsilon + Y_i)\right) \tag{34}$$

Note that the value, $Y_i$, is the luminance of the $i^{th}$ pixel of an input image of size N, and $\epsilon$ can be a constant (e.g., a constant having a relatively small value) to, for example, avoid or reduce the singularity might occur for black pixels. For the target display environment, the adaptation value La,t can be measured and/or computed, for example, by a target environment analyzer operating cooperatively with a sensor that can detect environmental characteristics, including a target illuminant. In some cases, a user can supply information that can influence the adaptation value $L_{a,t}$. Note that the subscript "t" can denote values associated with the target environment. In some embodiments, the adaptation value $L_{a,t}$ can be determined by measuring, for example, an 80% reflective patch (or equivalent sample) at various positions at the target environment at which the image will be observed. According to some embodiments, an input of a maximum luminance of a target display device, Ld,max, can also used as a reference point, as well as a minimum luminance of a target display device Ld,min for a blackpoint. Then, the image can be normalized so that the maximum value of luminance (e.g., as set forth by the Y channel) of the image, as displayed, does not exceed 100. Further, the source and target white points also can be scaled so that their Y components can equal 100.

For both source and target environments, parameters can be determined using various techniques, including those described herein. Such parameters can include the relative tristimulus values X, Y, and Z for the color, the relative tristimulus values Xw, Yw, and Zw for the white point, an adaptation level La (e.g., measured in cd/m²), the degree of adaptation D, and a qualifier (e.g., a surround value) as to whether the environment is average, dark, or dim. Note that the tristimulus values X, Y, and Z and the tristimulus values Xw, Yw, and Zw can be transformed into a cone color space to form tristimulus values ("L") 802a, ("M") 802b, and ("S") 802c, and tristimulus values ("Lw,s") 804a, ("Mw,s") 804b, and ("Sw,s") 804c, respectively. Note, too, that the tristimulus values Xw, Yw, and Zw (not shown) at the target environment can be transformed into the cone color space to form tristimulus values ("Lw,t") 870a, ("Mw,t") 870b, and ("Sw,t") 870c.

Semi-saturation generators 820 can be configured to generate semi-saturation values based on the white point of the source illuminant, as well as FL,s, which is a function of La,s (i.e. the source environment luminance). As shown, semi-saturation generators 820 can be configured to receive tristimulus values 804a, 804b, and 804c, as well as parameter ("n") 890, degree of adaption at the source environment ("Ds") 827 and parameter ("FL,s") 829 In some embodiments, semi-saturation generator ("σ1,L") 822 can operate in accordance with equation (35a) in association with the L channel, semi-saturation generator ("σ1,M") 824 can operate in accordance with equation (35b) in association with the M channel, and semi-saturation generator ("σ1,S") 826 can operate in accordance with equation (35c) in association with the S channel as follows.

$$\sigma_{1,L} = \frac{27.13^{1/n}}{F_{L,s}}(D_s L_{W,s} + (1 - D_s)100) \tag{35a}$$

$$\sigma_{1,M} = \frac{27.13^{1/n}}{F_{L,s}}(D_s M_{W,s} + (1 - D_s)100) \tag{35b}$$

$$\sigma_{1,S} = \frac{27.13^{1/n}}{F_{L,s}}(D_s S_{W,s} + (1 - D_s)100) \tag{35c}$$

Similarly, semi-saturation generators 860 can be configured to generate semi-saturation values based on the white point of the target illuminant, as well as FL,t, which is a function of La,t (i.e. the target environment luminance). As shown, semi-saturation generators 860 can be configured to receive tristimulus values for ("Lw,t") 870a, ("Mw,t") 870b, and ("Sw,t") 870c, as well as parameter ("n") 890, degree of adaption at the target environment ("Dt") 879 and parameter ("FL,t") 877. In some embodiments, semi-saturation generator ("σ2,L") 862 can operate in accordance with equation (36a) in association with the L channel, semi-saturation generator ("σ2,M") 864 can operate in accordance with equation (36b) in association with the M channel, and semi-saturation generator ("σ2,S") 866 can operate in accordance with equation (36c) in association with the S channel, but with parameters associated with the target environment.

$$\sigma_{2,L} = \frac{27.13^{1/n}}{F_{L,t}}(D_t L_{W,t} + (1 - D_t)100) \tag{36a}$$

$$\sigma_{2,M} = \frac{27.13^{1/n}}{F_{L,t}}(D_t M_{W,t} + (1 - D_t)100) \tag{36b}$$

$$\sigma_{2,S} = \frac{27.13^{1/n}}{F_{L,t}}(D_t S_{W,t} + (1 - D_t)100) \tag{36c}$$

Sigmoid transformer 810 can be configured to include sigmoid functions for each channel (e.g., L, M, and S) that receives a scaled value of the inputs L, M, and S, according to some embodiments. Thus, sigmoid transformer 810 can be configured to operate as sigmoid functions for each of the channels of the tristimulus values. In some examples, the sigmoid functions can be modified to provide simplified functionalities. While one example is shown in FIG. 8, sigmoid transformer 810 is not limited to the components and functions depicted therein. Here, sigmoid transformers 810 is shown to include scaling operators 812, 813, and 814, and compression operators 830, 832, and 834. Scaling operators 812, 813, and 814 can be configured to receive semi-saturation values σ1,L, σ1,M, and σ1,S from semi-saturation generators 822, 824, and 826, respectively, semi-saturation values σ2,L, σ1,M, and σ2,S from semi-saturation generators 866, 864, and 862, respectively, and tristimulus values for ("L") 802a, ("M") 802b, and ("S") 802c, respectively. In some embodiments, scaling operator 812 can operate in accordance with equation (37a) to produce a scaled L input ("Lm") 815a, scaling operator 813 can operate in accordance with equation (37b) to produce a scaled M input ("Mm") 815b, and scaling operator 814 can operate in accordance with equation (37c) to produce a scaled S input ("Sm") 815c, as follows.

$$L_m = \sigma_{1,L}\left(\frac{L\sigma_{2,L}}{400\sigma_{1,L}}\right)^{1/0.42} \tag{37a}$$

$$M_m = \sigma_{1,M}\left(\frac{M\sigma_{2,M}}{400\sigma_{1,M}}\right)^{1/0.42} \tag{37b}$$

$$S_m = \sigma_{1,S}\left(\frac{S\sigma_{2,S}}{400\sigma_{1,S}}\right)^{1/0.42} \tag{37c}$$

As shown, each of the inputs (e.g., L) can be scaled by a ratio of a semi-saturation value for a target environment to a semi-saturation value for a source environment. In view of equations (35a) to (36c), each of the inputs can be scaled by a ratio of a tristimulus target white point value to a tristimulus source white point value.

Compression operators 830, 832, and 834 can be configured to receive semi-saturation values σ1,L, σ1,M, and σ1,S from semi-saturation generators 822, 824, and 826, and scaled L input ("Lm") 815a, scaled M input ("Mm") 815b, and scaled S input ("Sm") 815c values, respectively, from scaling operators 812, 813, and 814. In some embodiments, compression operator 830 can operate in accordance with equation (38a), compression operator 832 can operate in accordance with equation (38b), and compression operator 834 can operate in accordance with equation (38c) as follows.

$$L_d = \frac{L_m^{0.42}}{L_m^{0.42} + \sigma_{1,L}^{0.42}} \quad (38a)$$

$$M_d = \frac{M_m^{0.42}}{M_m^{0.42} + \sigma_{1,M}^{0.42}} \quad (38b)$$

$$S_d = \frac{S_m^{0.42}}{S_m^{0.42} + \sigma_{1,S}^{0.42}} \quad (38c)$$

Equations (38a), (38b), and (38c) yield tristimulus values of ("Ld") 880a, ("Md") 880b, ("Sd") 880c, which represent the modified tristimulus values at the target for the color described by tristimulus values ("L") 802a, ("M") 802b, and ("S") 802c at the source. Therefore, response processor 801 can be configured to match colors over different viewing areas without performing an inverse appearance model function. Further, response processor 801 can be configured to reduce the ranges of intensity associated with tristimulus values ("L") 802a, ("M") 802b, and ("S") 802c. According to some embodiments, tristimulus values ("L") 802a, ("M") 802b, and ("S") 802c can be used to compute appearance correlates, or can be converted to XYZ space, with subsequent conversion to the RGB space (e.g., for use by a display device).

Note that the values produced by response processor 801 can be in the [0, 1] range, as determined by sigmoid functions. As such, response processor 801 can perform additional processing to produce useable display values. For example, the image at the target environment can be linearly scaled up to produce luminance values commensurate with the average luminance of the target environment (e.g., by scaling the tristimulus values 802a to 802c by La,t). This can produce pixel values that are color-compensated for the target viewing environment. Note that after performing linear scaling, the operational characteristics of the target display device can be analyzed to modify the color and/or the image. To illustrate, consider an example in which the target environment is relatively light and the display device has a low maximum light emission Ld,max. Then, the pixel values exceeding the display capabilities can be clamped against the value Ld,max. Note further that, in some embodiments, the pixel values also can be clamped against the value Ld,min if the target environment is relatively dark and the display device has a relatively high minimum emission Ld,min.

While this approach clamps values that are relatively high, this approach can facilitate the perceptibly correct display of other pixels. Note that if the target environment is well-lit and the maximum display luminance is low, many pixels can end up being clamped, leading to visible artifacts that may be unacceptable. For applications where the precise reproduction of color is less important, an alternative can be to linearly scale pixels to fit the display range if the maximum pixel value exceeds Ld,max. Otherwise, the image may be scaled by La,t and displayed without clamping. Thereafter, the image can be gamut mapped, gamma corrected, and/or converted to the color space defined by the primary colors and the white point of the display device.

Figure 9:
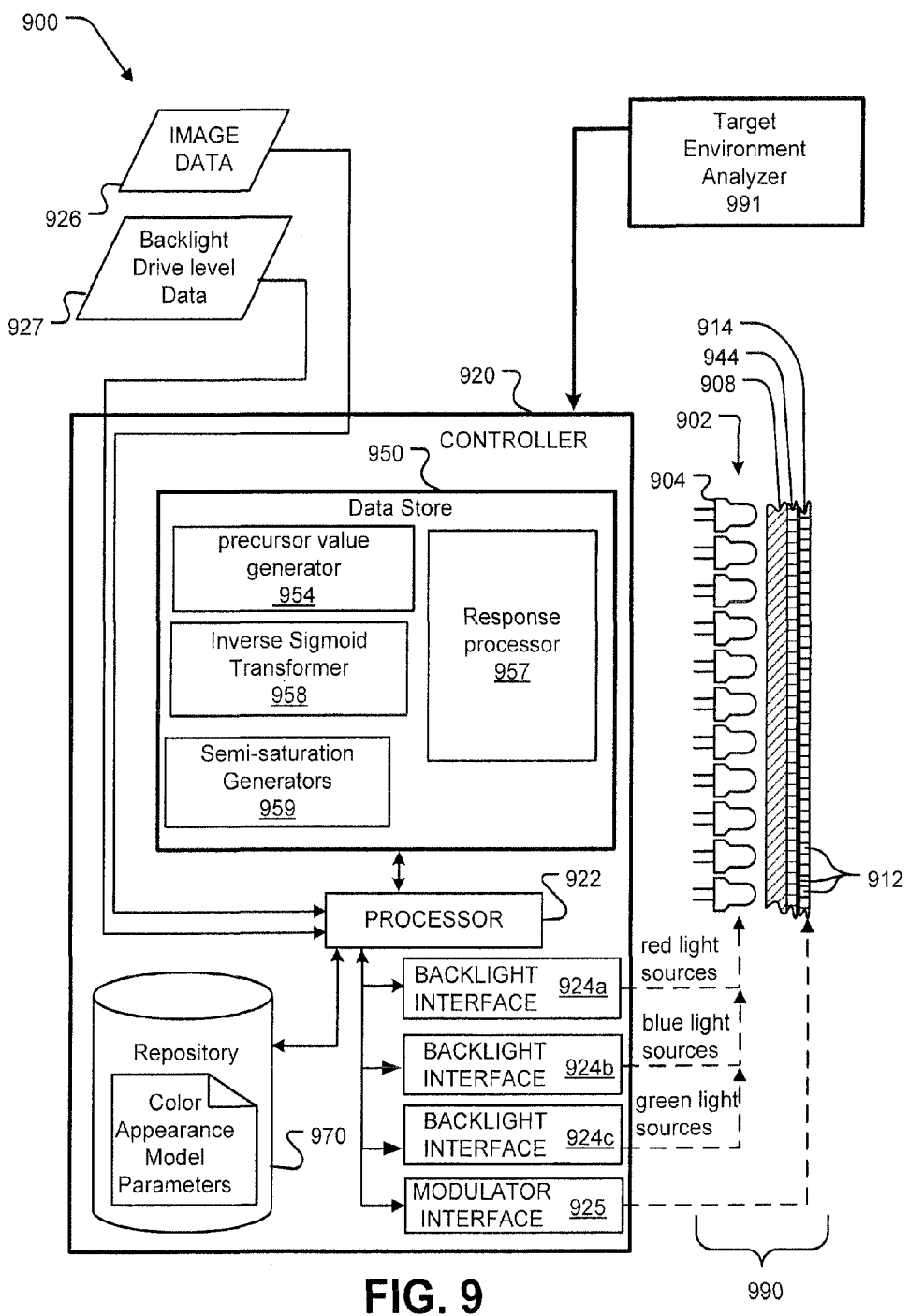
FIG. 9 is a schematic diagram of a controller configured to operate a display device having at least a front modulator, according to at least some embodiments of the invention.

FIG. 9 is a schematic diagram of a controller configured to operate a display device having at least a front modulator, according to at least some embodiments of the invention. System 900 includes a controller 920 configured to be coupled to a display device 990. Controller 920 can include a processor 922, a data store 950, a repository 970, and one or more backlight interface ("backlight interface") 924A configured to control a rear modulator, such as a backlight unit and its light sources, and an interface ("modulator interface") 924B configured to control a front modulator. Backlight interfaces 924a, 924b, and 925c are respectively configured to drive modulating elements 904, which can include an array of red light sources, an array of green light sources, and an array of blue light sources. Or, modulating elements 904 can include white light sources. According to at least some embodiments, controller 920 can be implemented in software, hardware, firmware, circuitry, or a combination thereof. Data store 950 can include one or more of the following modules: a precursor value generator 954, an inverse sigmoid transformers 958, and semi-saturation generators 959, which can function similar as to precursor value generator 511, inverse response parameter generator 520, and semi-saturation generators 540 of FIG. 5, respectively. Also, data store 950 can also include a response processor 957, which can be similar to response processor of FIGS. 7 and 8. Each of these modules can include executable instructions for performing the functionalities described herein. Repository 970 can be configured to store data structures including data representing color appearance model data, including parameter, as described herein. In some embodiments, target environment analyzer 991 can be configured detect or determine characteristics of the target environment, such as the white point of a target source illuminant. For example, environment analyzer 991 can be a sensor configured to measure the viewing environment at a display, thereby facilitating automatic determination of the state of adaptation of the viewer, among other things. According to at least some embodiments, controller 920 can be implemented as hardware modules, such as in programmable logic, including an FPGA or equivalent, or as part of an ASIC. Further, one or more of the following modules can be implemented as firmware: backlight generator 954, a mixed backlight synchronizer 956, spatial-temporal color synthesizer 958, and front modulator controller 959. In some embodiments, repository 970 can be implemented in programmable logic, including an FPGA.

Display device 990 can include a front modulator 914, a rear modulator 902, and optical structures 944 and 908 being configured to carry light from rear modulator 902 to front modulator 914. Front modulator 914 can be an optical filter of programmable transparency that adjusts the transmissivity of the intensity of light incident upon it from rear modulator 902. Rear modulator 902 can be configured to include one or more light sources. In some examples, rear modulator 902 can be formed from one or more modulating elements 904, such as one or more arrays of LEDs. The term rear modulator, as used herein in some embodiments, can refer to backlight, a backlight unit and modulated light sources, such as LEDs. In some examples, the rear modulator can include, but is not limited to a backlight having an array of controllable LEDs or organic LEDs ("OLEDs"). In some examples, front modulator 914 may comprise an LCD panel or other transmission-type light modulator having pixels 912. Front modulator 914 can be associated with a resolution that is higher than the resolution of rear modulator 902. In some embodiments, front modulator 914 may include, but is not limited to an LCD panel, LCD modulator, projection-type display modulators, active matrix LCD ("AMLCD") modulators, and other devices that modulate a light and/or image signal. Optical structures 944 and 908 can include elements such as, but not limited to, open space, light diffusers, collimators, and the like. In some examples, front modulator 914 and rear modulator 902 can be configured to collectively operate display device 990 as an HDR display, or in some embodiments, as an LDR display.

In some embodiments, controller 920 can be configured to provide front modulator drive signals, based upon input image 926 and backlight drive level data 927, to control the modulation of transmissivity associated with LCD pixels 912 of front modulator 914, thereby collectively presenting a desired image on display device 990. Although not shown, controller 920 may be coupled to a suitably programmed computer having software and/or hardware interfaces for controlling rear modulator 902 and front modulator 914 to display an image specified by data corresponding to input image 926. It may be appreciated that any of the elements described in FIG. 9 can be implemented in hardware, software, or a combination of these. In some embodiments, controller 920 can be implemented in projection-based image rendering devices and the like.

Figure 10:
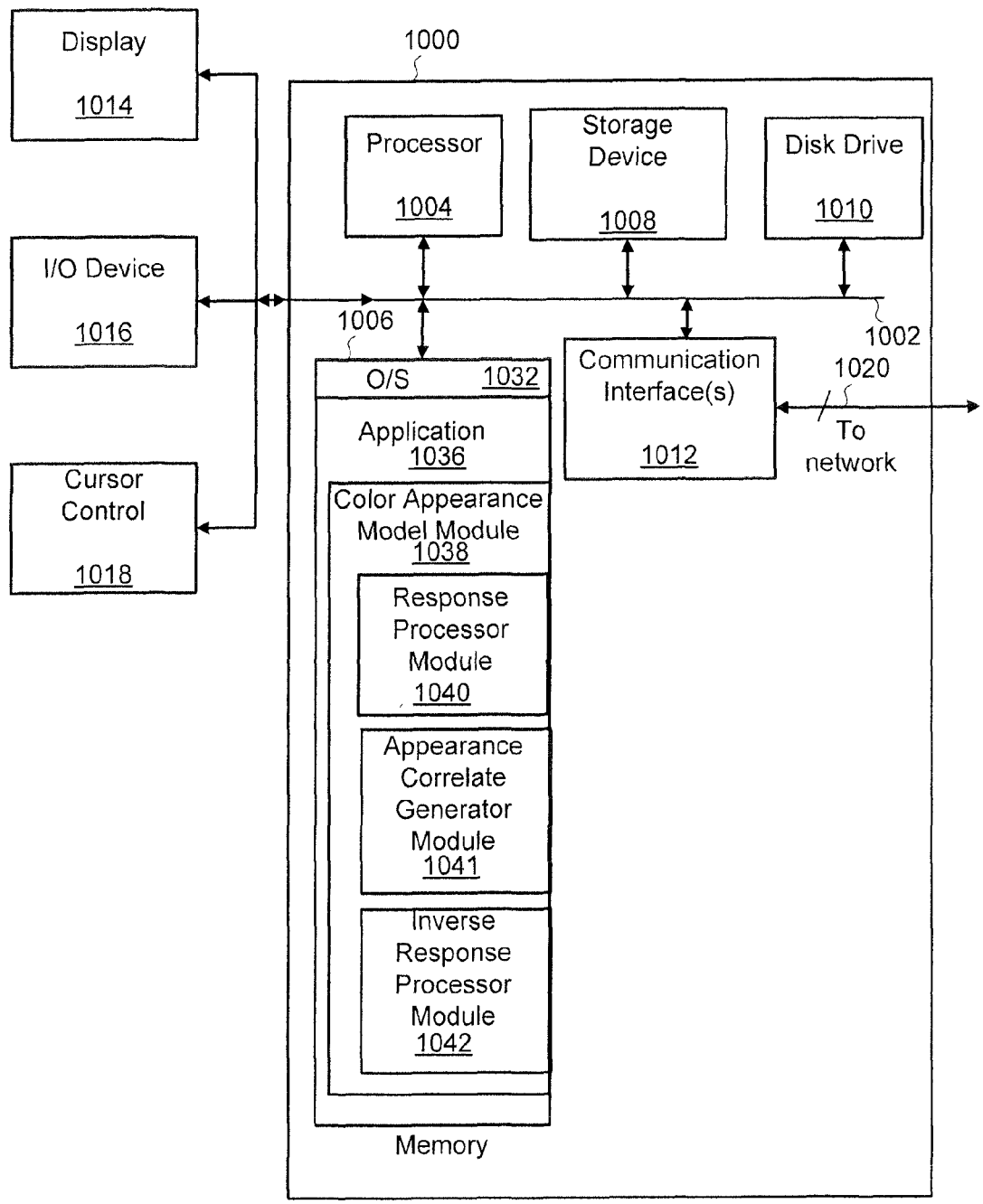
FIG. 10 illustrates an exemplary computer system suitable for matching color in different viewing environments, according to at least one embodiment of the invention.

FIG. 10 illustrates an exemplary computer system suitable for matching color in different viewing environments, according to at least one embodiment of the invention. In some examples, computer system 1000 can be used to implement computer programs, applications, methods, processes, or other software to perform the above-described techniques and to realize the structures described herein. Computer system 1000 includes a bus 1002 or other communication mechanism for communicating information, which interconnects subsystems and devices, such as one or more processors 1004, system memory ("memory") 1006, storage device 1008 (e.g., ROM), disk drive 1010 (e.g., magnetic or optical), communication interface 1012 (e.g., a modem, Ethernet card, or any other interface configured to exchange data with a communications network or to control a fabrication machine), display 1014 (e.g., CRT or LCD), input device 1016 (e.g., keyboard), and pointer cursor control 1018 (e.g., mouse or trackball).

According to some examples, computer system 1000 performs specific operations in which processor 1004 executes one or more sequences of one or more instructions stored in system memory 1006. Such instructions can be read into system memory 1006 from another computer readable medium, such as static storage device 1008 or disk drive 1010. In some examples, hard-wired circuitry can be used in place of or in combination with software instructions for implementation. In the example shown, system memory 1006 includes modules of executable instructions for implementing an operation system ("O/S") 1032, an application 1036, and an epitaxy control module 1038, which, in turn, can implement a response processor module 1040, an appearance correlate generator module 1041, and an inverse response processor module 1042, each of which can provide functionalities described herein.

The term "computer readable medium" refers, at least in one embodiment, to any medium that participates in providing instructions to processor 1004 for execution. Such a medium can take many forms, including but not limited to, non-volatile media, volatile media, and transmission media. Non-volatile media includes, for example, optical or magnetic disks, such as disk drive 1010. Volatile media includes dynamic memory, such as system memory 1006. Transmission media includes coaxial cables, copper wire, and fiber optics, including wires that comprise bus 1002. Transmission media can also take the form of electromagnetic, acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, time-dependent waveforms, or any other medium from which a computer can read instructions.

In some examples, execution of the sequences of instructions can be performed by a single computer system 1000. According to some examples, two or more computer systems 1000 coupled by communication link 1020 (e.g., links to LAN, PSTN, or wireless network) can perform the sequence of instructions in coordination with one another. Computer system 1000 can transmit and receive messages, data, and instructions, including program code (i.e., application code) through communication link 1020 and communication interface 1012. Received program code can be executed by processor 1004 as it is received, and/or stored in disk drive 1010, or other non-volatile storage for later execution. In one embodiment, system 1000 (or a portion thereof) can be integrated into an image capture device or a display device for matching colors.

The above-described methods, techniques, processes, apparatuses and computer-medium products and systems may be implemented in a variety of applications, including, but not limited to, HDR displays, displays of portable computers, digital clocks, watches, appliances, electronic devices, audio-visual devices, medical imaging systems, graphic arts, televisions, projection-type devices, and the like.

In some examples, the methods, techniques and processes described herein may be performed and/or executed by executable instructions on computer processors, for which such methods, techniques and processes may be performed. For example, one or more processors in a computer or other display controller may implement the methods describe herein by executing software instructions in a program memory accessible to a processor. Additionally, the methods, techniques and processes described herein may be implemented using a graphics processing unit ("GPU") or a control computer, or field-programmable gate array ("FPGA") or other integrated circuits coupled to the display. These methods, techniques and processes may also be provided in the form of a program product, which may comprise any medium which carries a set of computer-readable instructions which, when executed by a data processor, cause the data processor to execute such methods, techniques and/or processes. Program products, may include, but are not limited to: physical media such as magnetic data storage media, including floppy diskettes, and hard disk drives; optical data storage media including CD ROMs, and DVDs; electronic data storage media, including ROMs, flash RAM, non-volatile memories, thumb-drives, or the like; and transmission-type media, such as digital or analog communication links, virtual memory, hosted storage over a network or global computer network, and networked-servers.

In at least some examples, the structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any, and can be distributed spatially. As software, the above-described techniques may be implemented using various types of programming or formatting languages, frameworks, syntax, applications, protocols, objects, or techniques, including C, Objective C, C++, C#, Flex™, Fireworks®, Java™, Javascript™, AJAX, COBOL, Fortran, ADA, XML, HTML, DHTML, XHTML, HTTP, XMPP, Ruby on Rails, and others. As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. These can be varied and are not limited to the examples or descriptions provided.

Various embodiments or examples of the invention may be implemented in numerous ways, including as a system, a process, an apparatus, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided herein along with accompanying figures. The detailed description is provided in connection with such examples, but is not limited to any particular example. The scope is limited only by the claims, and numerous alternatives, modifications, and equivalents are encompassed. Numerous specific details are set forth in the description in order to provide a thorough understanding. These details are provided as examples and the described techniques may be practiced according to the claims without some or all of the accompanying details. They are not intended to be exhaustive or to limit the invention to the precise forms disclosed, as many alternatives, modifications, equivalents, and variations are possible in view of the above teachings. For clarity, technical material that is known in the technical fields related to the examples has not been described in detail to avoid unnecessarily obscuring the description.

The various examples of the invention may be implemented in numerous ways, including as a system, a process, an apparatus, or a series of program instructions on a computer readable medium such as a computer readable storage medium or a computer network where the program instructions are sent over optical or electronic communication links. In general, the flows of disclosed processes may be performed in an arbitrary order, unless otherwise provided in the claims.

The description, for purposes of explanation, uses specific nomenclature to provide a thorough understanding of the invention. However, it will be apparent that specific details are not required in order to practice the invention. In fact, this description should not be read to limit any feature or aspect of the present invention to any embodiment; rather features and aspects of one example can readily be interchanged with other examples. Notably, not every benefit described herein need be realized by each example of the present invention; rather any specific example may provide one or more of the advantages discussed above. In the claims, elements and/or operations do not imply any particular order of operation, unless explicitly stated in the claims. It is intended that the following claims and their equivalents define the scope of the invention.

What is claimed:

1. A method of modifying color associated with a source environment for presentation at a target environment, the method comprising:
   applying different non-linear functions to transform subsets of data representing a color of a sample at the source environment into transformed subsets of data; and
   generating data representing a chroma correlate as an appearance correlate independent of data representing a hue-related correlate,
   wherein the chroma correlate is configured to generate the color at a device at the target environment; and
   wherein applying the different non-linear functions further comprises:
   determining each of the transformed subsets of data as a function of a subset of data representing a white point, the subset of data representing the white point being one of a number of subsets of data representing the white point.

2. The method of claim 1 wherein applying the different non-linear functions comprises:
   adjusting a white point associated with the subsets of data representing the color; and
   scaling intensity values associated with the color,
   wherein adjusting the white point and scaling the intensity values are performed in the same color space.

3. The method of claim 1 wherein adjusting the white point comprises:
   performing chromatic adaptation.

4. The method of claim 1 wherein scaling the intensity values comprises:
   performing nonlinear response compression.

5. The method of claim 1 wherein the same color space comprises:
   a cone color space represented by a set of long, medium, and short tristimulus values.

6. The method of claim 1 wherein the subsets of data representing the color comprise:
   tristimulus values for the color.

7. The method of claim 1 wherein the subsets of data representing the white point comprise:
   tristimulus values for the white point.

8. A method of modifying color associated with a source environment for presentation at a target environment, the method comprising:
   applying different non-linear functions to transform subsets of data representing a color of a sample at the source environment into transformed subsets of data; and
   generating data representing a chroma correlate as an appearance correlate independent of data representing a hue-related correlate,
   wherein the chroma correlate is configured to generate the color at a device at the target environment; and
   wherein applying the different non-linear functions further comprises:
   determining tristimulus values for the color of the sample; and
   implementing two or more sigmoid functions that are configured to form other tristimulus values for the transformed subsets of data,
   wherein each of the two or more sigmoid functions is configured to nonlinearly compress a range of intensity values.

9. The method of claim 8 wherein implementing the two or more sigmoid functions comprises:
   using at least two different semi-saturation values.

10. The method of claim 8 further comprising:
    generating at least one appearance correlate using a first opponent transformation and a second opponent transformation.

11. A method of modifying color associated with a source environment for presentation at a target environment, the method comprising:
    applying different non-linear functions to transform subsets of data representing a color of a sample at the source environment into transformed subsets of data; and
    generating data representing a chroma correlate as an appearance correlate independent of data representing a hue-related correlate, wherein the chroma correlate is configured to generate the color at a device at the target environment; and the method further comprising:

transforming the transformed subsets of data representing the color to form data representing a first set of opponent color correlates; and transforming the data representing the first set of opponent values to form data representing a second set of opponent color correlates.

12. The method of claim 11 wherein transforming the transformed subsets of data representing the color comprises:

generating appearance correlates using a first color space comprising a first opponent color correlate associated with a substantially pinkish-red and a substantially greenish-yellow and a second opponent color correlate associated with a substantially cyan and a substantially violet.

13. The method of claim 11 further comprising:

generating data representing a lightness correlate and data representing the chroma correlate based on the first set of opponent color correlates.

14. The method of claim 11 wherein transforming the data representing the second set of opponent color correlates comprises:

generating appearance correlates using a second color space comprising an opponent color correlate associated with a substantially red and a substantially green and another opponent color correlate associated with a substantially blue and a substantially yellow.

15. The method of claim 11 further comprising:

data representing the hue correlate based on the second set of opponent color correlates.

16. The method of claim 1 further comprising:

generating appearance correlates using multiple color space transformations.

17. The method of claim 16 further comprising:

generating modified subsets of data representing the color at the target environment based on the appearance correlates.

18. The method of claim 17 further comprising:

transforming one or more of the appearance correlates to form at the target environment the transformed subsets of data representing the color.

19. A method of modifying color associated with a source environment for presentation at a target environment, the method comprising:

applying different non-linear functions to transform subsets of data representing a color of a sample at the source environment into transformed subsets of data; and generating data representing a chroma correlate as an appearance correlate independent of data representing a hue-related correlate, wherein the chroma correlate is configured to generate the color at a device at the target environment;

wherein applying the different non-linear functions comprises:

adjusting a white point associated with the subsets of data representing the color; and scaling intensity values associated with the color, wherein adjusting the white point and scaling the intensity values are performed in the same color space;

the method further comprising:

generating appearance correlates using multiple color space transformations;

generating modified subsets of data representing the color at the target environment based on the appearance correlates;

transforming one or more of the appearance correlates to form at the target environment the transformed subsets of data representing the color; and implementing two or more inverse sigmoid functions that are configured to form the modified subsets of data representing the color at the target environment.

* * * * *